(12) United States Patent
Murakami et al.

(10) Patent No.: US 7,577,946 B2
(45) Date of Patent: Aug. 18, 2009

(54) PROGRAM PRODUCT, METHOD, AND SYSTEM FOR TESTING CONSISTENCY OF MACHINE CODE FILES AND SOURCE FILES

(75) Inventors: Sadayuki Murakami, Kawasaki (JP); Kohji Kiyota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 578 days.

(21) Appl. No.: 10/360,737

(22) Filed: Feb. 10, 2003

(65) Prior Publication Data

US 2003/0167423 A1 Sep. 4, 2003

(30) Foreign Application Priority Data

Mar. 1, 2002 (JP) .............. 2002-055963

(51) Int. Cl.
G06F 9/45 (2006.01)
G06F 9/44 (2006.01)

(52) U.S. Cl. ............... 717/145; 717/121; 717/164

(58) Field of Classification Search ........... 717/124
See application file for complete search history.

(56) References Cited

U.S. PATENT DOCUMENTS

| 5,805,899 | A | * | 9/1998 | Evans et al. | .......... 717/170 |
| 5,850,554 | A | * | 12/1998 | Carver | .......... 717/162 |
| 5,978,586 | A | * | 11/1999 | Baisley et al. | .......... 717/158 |
| 5,978,587 | A | * | 11/1999 | Baisley et al. | .......... 717/144 |
| 6,185,574 | B1 | * | 2/2001 | Howard et al. | .......... 707/200 |
| 6,438,743 | B1 | * | 8/2002 | Boehm et al. | .......... 717/122 |
| 6,678,883 | B1 | * | 1/2004 | Berry et al. | .......... 717/128 |

(Continued)

FOREIGN PATENT DOCUMENTS

JP 02-76029 3/1990

(Continued)

OTHER PUBLICATIONS

"Memory aware compilation through accurate timing extraction", Grun et al., Dec. 2000, pp. 316-321. Online retrieved at <http://delivery.scm.org/10.1145/340000/337428/p316-grun.pdf>.*

(Continued)

*Primary Examiner*—Tuan Q Dam
*Assistant Examiner*—Thuy Dao
(74) *Attorney, Agent, or Firm*—Staas & Halsey LLP

(57) ABSTRACT

A consistency test program which facilitates the user to check whether a compiled machine code file reflects all modifications made to its source file. When a source code is compiled into a machine code, a source file attribute record is produced from file attributes of the source file and added to the resultant machine code file. The record includes file location of the source file, and information such as file size and timestamp that will be updated each time the source file is modified. The source file attribute record enables the user to check afterwards whether the machine code file is still consistent with the latest source code. This consistency test is performed by extracting the source file attribute record from the machine code file, obtaining current attributes of a file that is located by the file location information, and comparing the source file attribute record with the current attributes.

11 Claims, 21 Drawing Sheets

U.S. PATENT DOCUMENTS

| | | | |
|---|---|---|---|
| 6,948,163 B2* | 9/2005 | Melahn et al. | 717/168 |
| 7,058,667 B2* | 6/2006 | Goldick | 707/203 |
| 2002/0116702 A1* | 8/2002 | Aptus et al. | 717/170 |
| 2002/0199170 A1* | 12/2002 | Jameson | 717/120 |
| 2003/0097581 A1* | 5/2003 | Zimmer | 713/200 |
| 2003/0154470 A1* | 8/2003 | Applin et al. | 717/170 |

FOREIGN PATENT DOCUMENTS

| | | |
|---|---|---|
| JP | 2000-172492 | 6/2000 |

OTHER PUBLICATIONS

"Partial method compilation using dynamic profile information", J. Waley, Dec. 2001, pp. 166-179. Online retrieved <http://portal.acm.org/citation.cfm?id=504282.504295>.*

"Calpa: a tool for automating selective dynamic compilation", Mock et al., Dec. 2000, pp. 291-302. Online retrieved at <http://ieeexplore.ieee.org/stamp/stamp.jsp?tp=arnumber=898079>.*

Japanese Patent Abstract No. 05233233 dated Sep. 10, 1993.

Japanese Office Action for Application No. 2002-055963; dated Oct. 17, 2006 (6 pages with partial translation).

* cited by examiner

| No. | XML ELEMENT | DESCRIPTION | VALUE |
|---|---|---|---|
| 1 | xml | Represents XML data.<br>Contains the following elements:<br>　"source"<br>　"object" | |
| 2 | source | Represents source file attributes.<br>Contains the following elements:<br>　"url"<br>　"timestamp"<br>　"size" | |
| 3 | object | Represents object file attributes.<br>Contains the following elements:<br>　"url"<br>　"timestamp"<br>　"size" | |
| 4 | url | Represents the location of a source file or object file. | standard URL format |
| 5 | timestamp | Represents the last modified date of a source file or object file. | YYYY/MM/DD hh:mm:ss<br>YYYY: year<br>MM: month<br>DD: day of month<br>hh: hours<br>mm: minutes<br>ss: seconds |
| 6 | size | Represents the size of a source file or object file. | decimal number in bytes |

FIG. 7

510 SUMMARY REPORT

```
<xml>
  <summary>
    <program no=1>
      <name>PG1000</name>
      <date>2001/12/07 16:00:00</date>
      <object>
        <url>http://sv1/mast/lod/obj/pg1.o</url>
        <original>
          <timestamp>2001/07/30 12:00:00</timestamp>
          <size>10360</size>
        </original>
        <current>
          <timestamp>2001/07/30 12:00:00</timestamp>
          <size>10360</size>
        </current>
      </object>
      <source>
        <url>http://sv1/mast/src/pg1.c</url>
        <original>
          <timestamp>2001/07/30 14:00:00</timestamp>
          <size>4960</size>
        </original>
        <current>
          <timestamp>2001/07/30 15:00:00</timestamp>
          <size>4960</size>
        </current>
      </source>
      <object>
        <url>http://sv1/mast/lod/obj/pg2.o</url>
        <original>
          <timestamp>2001/07/29 10:00:00</timestamp>
          <size>1360</size>
        </original>
        <current>
          <timestamp>2001/07/29 10:00:00</timestamp>
          <size>1360</size>
        </current>
      </object>
      <source>
        <url>http://sv1/mast/src/pg2.c</url>
        <original>
          <timestamp>2001/07/29 09:00:01</timestamp>
          <size>4960</size>
        </original>
        <current>
          <timestamp>2001/07/29 09:00:01</timestamp>
          <size>4960</size>
        </current>
      </source>
    </program>
    <program no=2>
      <name>PG2000</name>
      <date>2001/12/07 16:01:00</date>
         .
         .
         .
    </program>
  </summary>
</xml>
```

FIG. 19

520 ALARM REPORT

```
<xml>
 <alarm>
  <program no=1>
   <name>PG1000</name>                                    — 521
   <date>2001/12/07 16:00:00</date>                       — 522
   <object>                                               — 523
    <url>http://sv1/mast/lod/obj/pg1.o</url>
    <original>
     <timestamp>2001/07/30 12:00:00</timestamp>
     <size>10360</size>
    </original>
    <current>
     <timestamp>2001/07/30 12:00:00</timestamp>
     <size>10360</size>
    </current>
   </object>                                              ⎫
   <source>                                               ⎬ 524
    <url>http://sv1/mast/src/pg1.c</url>                  ⎭
    <original>
     <timestamp>2001/07/30 14:00:00</timestamp>
     <size>4960</size>
    </original>
    <current>
     <timestamp>2001/07/30 15:00:00</timestamp>
     <size>4960</size>
    </current>
   </source>
   <status>                                               — 525
    <msg no=1>This executive file contains an object file that has been modified.</msg>
    <msg no=2>The source of this object file has been modified.</msg>
   </status>
  </program>
 </alarm>
</xml>
```

FIG. 20

PROGRAM PRODUCT, METHOD, AND SYSTEM FOR TESTING CONSISTENCY OF MACHINE CODE FILES AND SOURCE FILES

BACKGROUND OF THE INVENTION

1. Field of the Invention

The present invention relates to a program product, method, and system for supporting a consistency test of a compiled machine code file with respect to the original version and current version of its source file. More particularly, the present invention relates to a consistency test program product, method, and system which ensure the consistency among program files used as library resources.

2. Description of the Related Art

In modern software development, programmers use various precoded library resources, a collection of fundamental, general-purpose processing functions that can be called from an application program as necessary. The use of such software modules improves the efficiency of development because programmers can concentrate their efforts to the coding of specific application functions, without worrying about the details of generic services.

A typical library building process starts with writing source codes in an appropriate programming language to describe a specific processing logic. The outcome of this step is a source file, which is then converted into an object file through a compilation process. A plurality of object files are produced in this way and subjected to a process of linking them together into an executive file. Hereafter, we will use the term "library resources" to collectively represent those source files, object files, and executive files.

To clarify the definitions, source files store a source code written by a software engineer, or programmer. Object files store an object code obtained by translating a source code into a machine code that is executable by a computer. In general, one object file is produced from one source file. Executive files store a load module of computer-executable machine code that is obtained by linking a plurality of object codes.

General computer systems store a large number of executive files as library resources because of their multipurpose nature. Application programs use precoded processing functions by calling executive codes available in the library. Those library resources, however, are modified for various reasons, including bug fixes (i.e., correcting program errors found after release) and implementation of additional capabilities. Such changes start with editing a source file. The modified source file is then recompiled, and the resulting new object file is used to create a new version of executive files.

Since source files may be changed as described above, users of library resources need to know whether their executive files at hand are up to date. To make such update information available to users, conventional systems provide in general a registry that lists source files used in creating executive files. Each time a person creates an executive file, he/she enters a record to the registry to show the association between a new executive file version and its corresponding source file versions. Managing library resources with such registries, however, is a labor-consuming, error-prone task. The problem is that it is difficult to ensure the correctness of information since people are likely to make errors or forget to write necessary things. This leads to a demand for an automated method that helps the users to test whether their local library resources reflect all modifications made to source files.

SUMMARY OF THE INVENTION

In view of the foregoing, it is an object of the present invention to provide a consistency test program product, consistency test method, and consistency test system which make it easier for the user to check whether a compiled machine code program reflects all modifications made to its source files.

To accomplish the above object, according to the present invention, there is provided a program product, for use with a computer system, which supports a consistency test of a machine code file with respect to the original version and current version of its source file. This program product causes the computer system to perform the following steps: (a) producing a source file attribute record when a source code in a source file is compiled into a machine code file, wherein the source file attribute record includes file location information indicating where the source file is saved and information that is to be updated each time the source file is modified; and (b) adding the source file attribute record to the machine code file.

To accomplish the above object, the present invention also provides a method which supports a consistency test of a machine code file with respect to the original version and current version of its source file. This method comprises the following steps: (a) producing a source file attribute record when a source code in a source file is compiled into a machine code file, wherein the source file attribute record includes file location information indicating where the source file is saved and information that is to be updated each time the source file is modified; and (b) adding the source file attribute record to the machine code file.

To accomplish the above object, the present invention further provides a system which supports a consistency test of a machine code file with respect to the original version and current version of its source file. This system comprises the following elements: an attribute record generation unit which produces a source file attribute record when a source code in a source file is compiled into a machine code file, wherein the source file attribute record includes file location information indicating where the source file is saved and information that is to be updated each time the source file is modified; and an attribute record insertion unit which adds the source file attribute record to the machine code file.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 7 shows structuring rules used in creating an attribute record in XML form;

FIG. 19 shows an example of a summary report compiled in XML form;

FIG. 20 shows an example of an alarm report compiled in XML form; and

DESCRIPTION OF THE PREFERRED EMBODIMENTS

Figure 1:
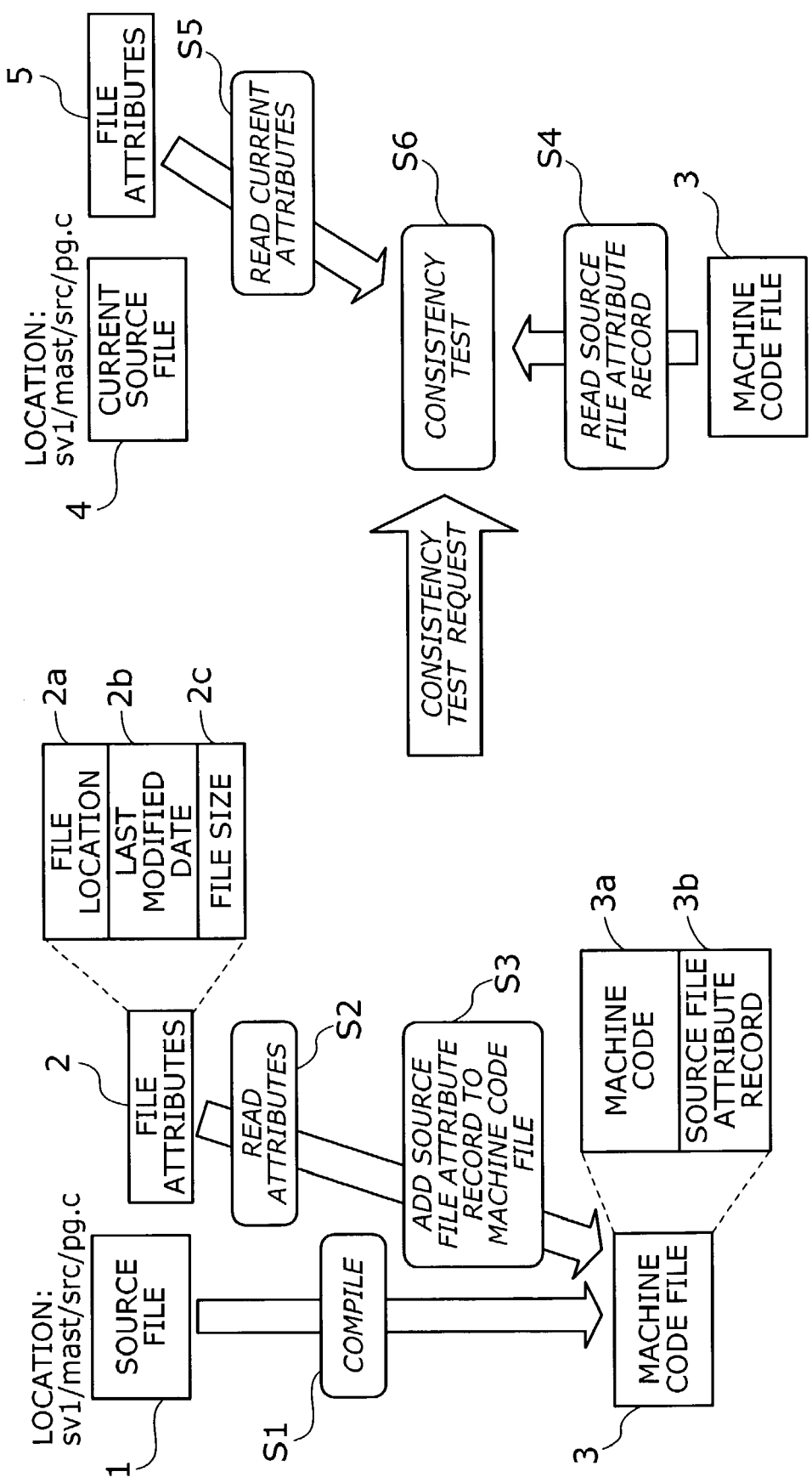
FIG. 1 is a conceptual view of the present invention.

Preferred embodiments of the present invention will be described below with reference to the accompanying drawings, wherein like reference numerals refer to like elements throughout.

We begin with the concept of the present invention before explaining a specific embodiment. FIG. 1 is a conceptual view of the present invention, which shows how a computer system (not explicitly shown) executes a consistency test program according to the present invention. Specifically, the computer system compiles a source code in the a source file 1 into a machine code 3a (step S1), thus producing a machine code file 3. At the same time, the computer system collects file attributes 2 (step S2) of the source file 1, which include, for example, the following information: file location 2a, last modified date 2b, and file size 2c. The file location 2a indicates where the source file 1 is stored. The last modified date 2b shows when the source file 1 was modified last time. The file size 2c represents how much storage space the source file 1 takes up. Note that the last two pieces of information are automatically updated each time one modifies the source file 1. Those collected source attributes 2 are added to the created machine code file 3 (step S2). FIG. 1 shows this as a source file attribute record 3b.

Afterwards, the computer system receives a consistency test request from an external source (not shown) which specifies the above-described machine code file 3 as the test subject. This request causes the computer system to read out the source file attribute record 3b from the machine code file 3 under test (step S4). By extracting file location information out of the source file attribute record 3b, the computer system identifies where the machine code file 3's original source is supposed to be. That is, the extracted file location information points at a current source file 4, which may or may not be the same as the source file 1 at the time of compilation. The computer system then reads out file attributes 5 of the current source file 4 (step S5), including the last modified date and file size, both of which are subject to update at each occurrence of modification to that file 4. The computer system compares those file attributes 5 of the current source file 4 with the source file attribute record 3b of the machine code file 3 under test, thus determining whether the original source file 1 of the machine code file 3 is consistent with the current source file 4 (step S6).

To be more specific about the consistency test at step S6, the computer system determines that the original source file 1 is consistent with the current source file 4 when their last update dates and file sizes agree with each other on both accounts. Any mismatch in either last update dates or file sizes is considered as inconsistency between the two files 1 and 4, meaning that some modification was made to the source file 1 after the compilation at step S1. In other words, the original source of the machine code file 3 under test is not the up-to-date version, and the new content or modified content of the source file 1 is not reflected in the machine code file 3. Stated in reverse, the agreement of the two files 1 and 4 proves that the machine code file 3 in question derives from the source file 1 of the latest version.

As can be seen from the above explanation, the proposed consistency test system appends source file attributes 2 to an executive machine code file 3 when it is compiled from a source file 1. This appended information helps the user test afterwards whether the machine code file 3 reflects all modifications made to its original source file 1. This feature of the present invention ensures the accuracy in testing the consistency of a large collection of executive files which are provided as library resources for software development.

While there are some exceptions, most executive files are created not directly from source scripts, but via object codes. That is, each source code file is compiled into an object code file, and the object code files are then linked together into one or more executable files. In this case, one should test whether the executive file is consistent with respect to its original object files, as well as whether each object file is consistent with respect to its original source file.

Figure 2:
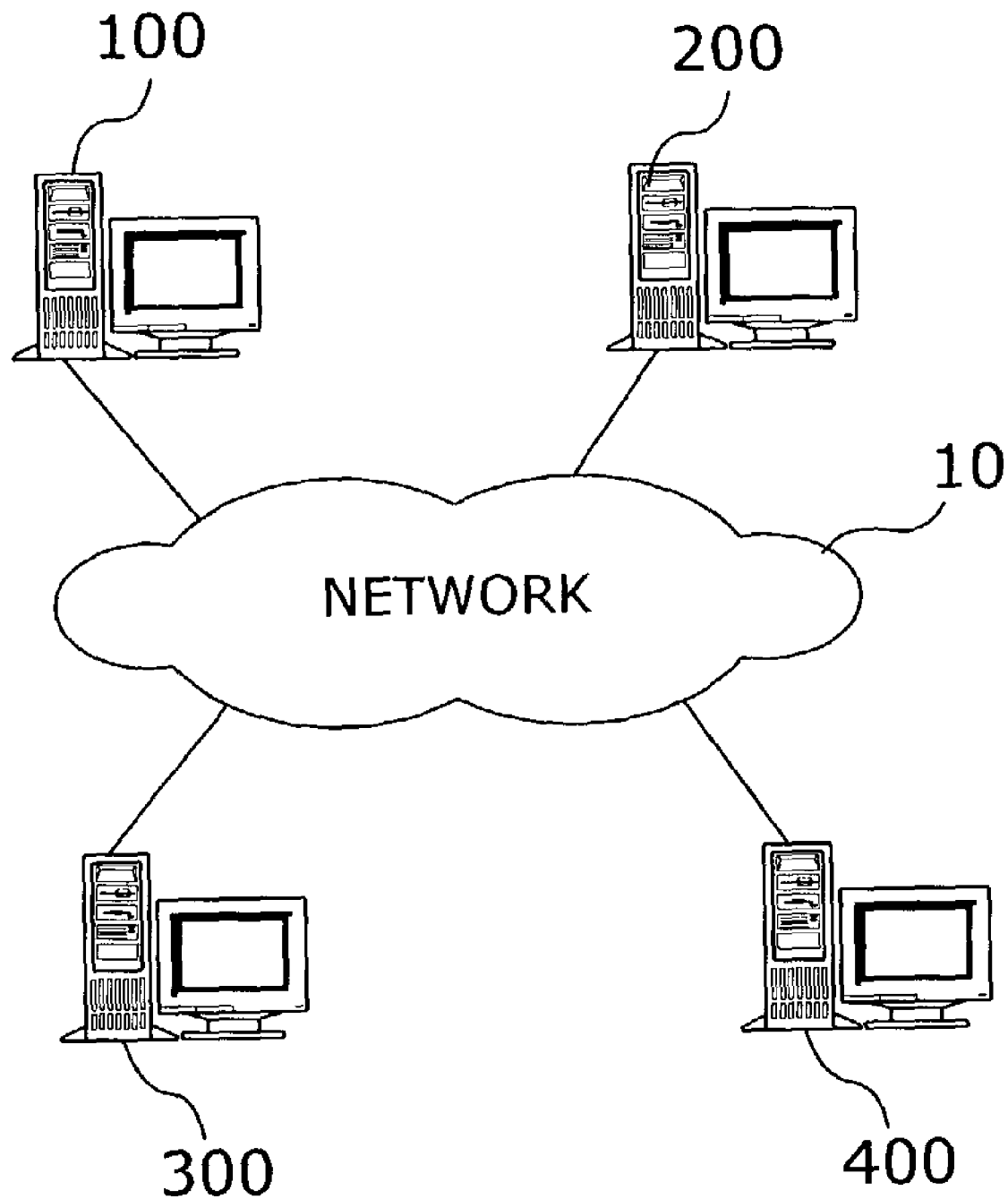
FIG. 2 shows a system in which the present invention is embodied.

Referring now to FIG. 2 and subsequent drawings, we will present a consistency test system according to an embodiment of the present invention, which tests library resources including executive files that are produced from object files. The system of FIG. 2 involves a plurality of computers 100, 200, 300, and 400 on a network 10, each computer having a library consistency test program of the present invention.

Figure 3:
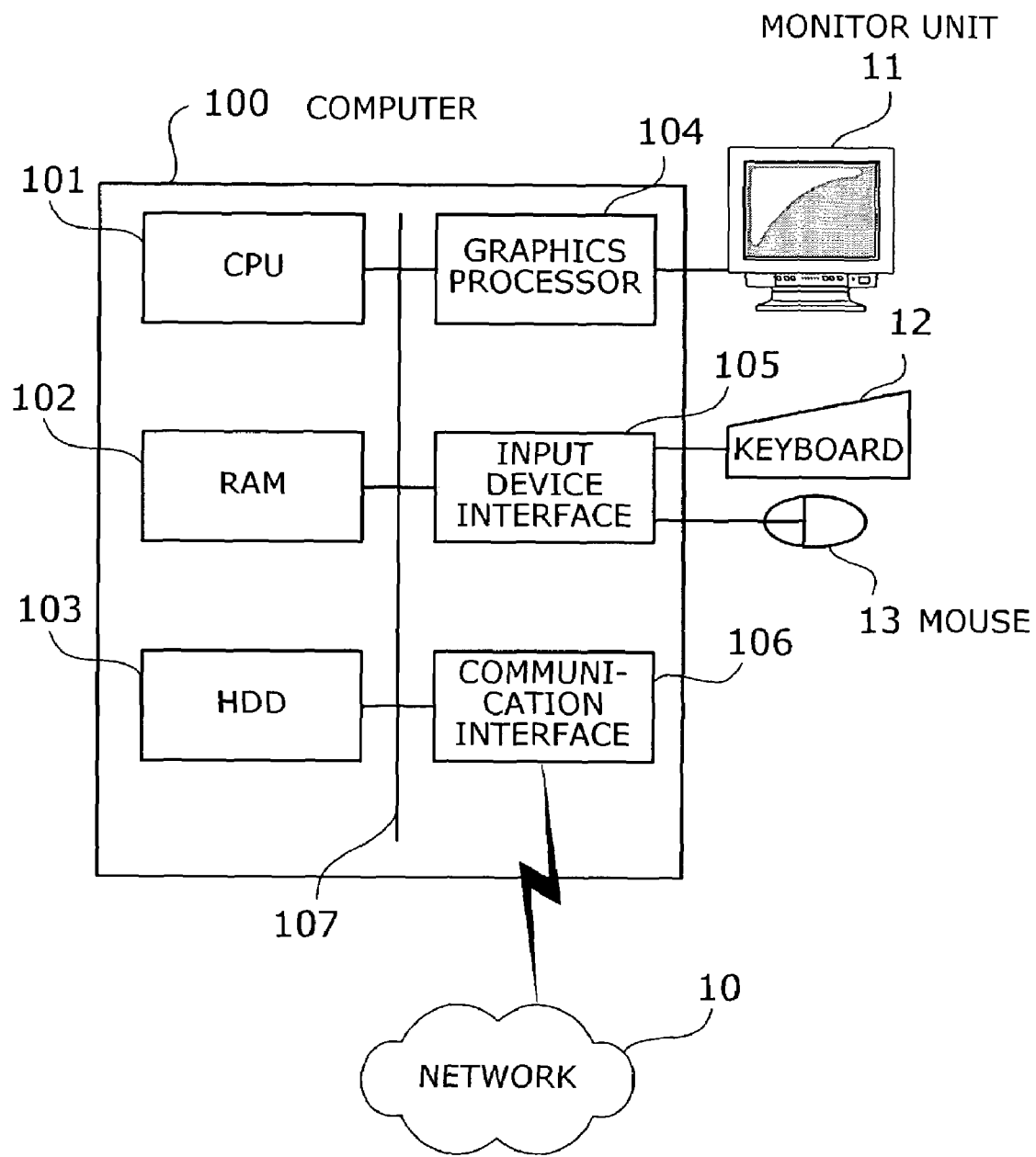
FIG. 3 shows an example of a computer platform on which the present invention is embodied.

FIG. 3 shows an example of a computer hardware platform on which the present invention is implemented. While FIG. 3 shows only one computer 100, the other computers 200, 300, and 400 shown in FIG. 2 have a similar internal structure. The illustrated computer 100 comprises the following components: a central processing unit (CPU) 101, a random access memory (RAM) 102, a hard disk drive (HDD) 103, a graphics processor 104, an input device interface 105, and a communication interface 106. Here, the CPU 101 controls the entire system, interacting with other elements via a common bus 107. The RAM 102 temporarily stores at least a part of operating system programs and application programs that the CPU 101 executes, in addition to other various data objects manipulated at runtime. The HDD 103 stores library resources, in addition to the operating system (OS) and application programs.

The graphics processor 104 produces video images in accordance with drawing commands from the CPU 101 and displays them on the screen of an external monitor unit 11 coupled thereto. The input device interface 105 is used to receive signals from external input devices, such as a keyboard 12 and a mouse 13. Those input signals are supplied to the CPU 101 via the bus 107. The communication interface 106 allows the CPU 101 to exchange data with other computers on the network 10.

A library consistency test program is executed on the above-described hardware platform of the computer 100, so as to provide the intended processing steps of the present embodiment. Hereafter, we will use the term "library consistency test unit" to represent a set of functions that are embodied by the library consistency test program.

Figure 4:
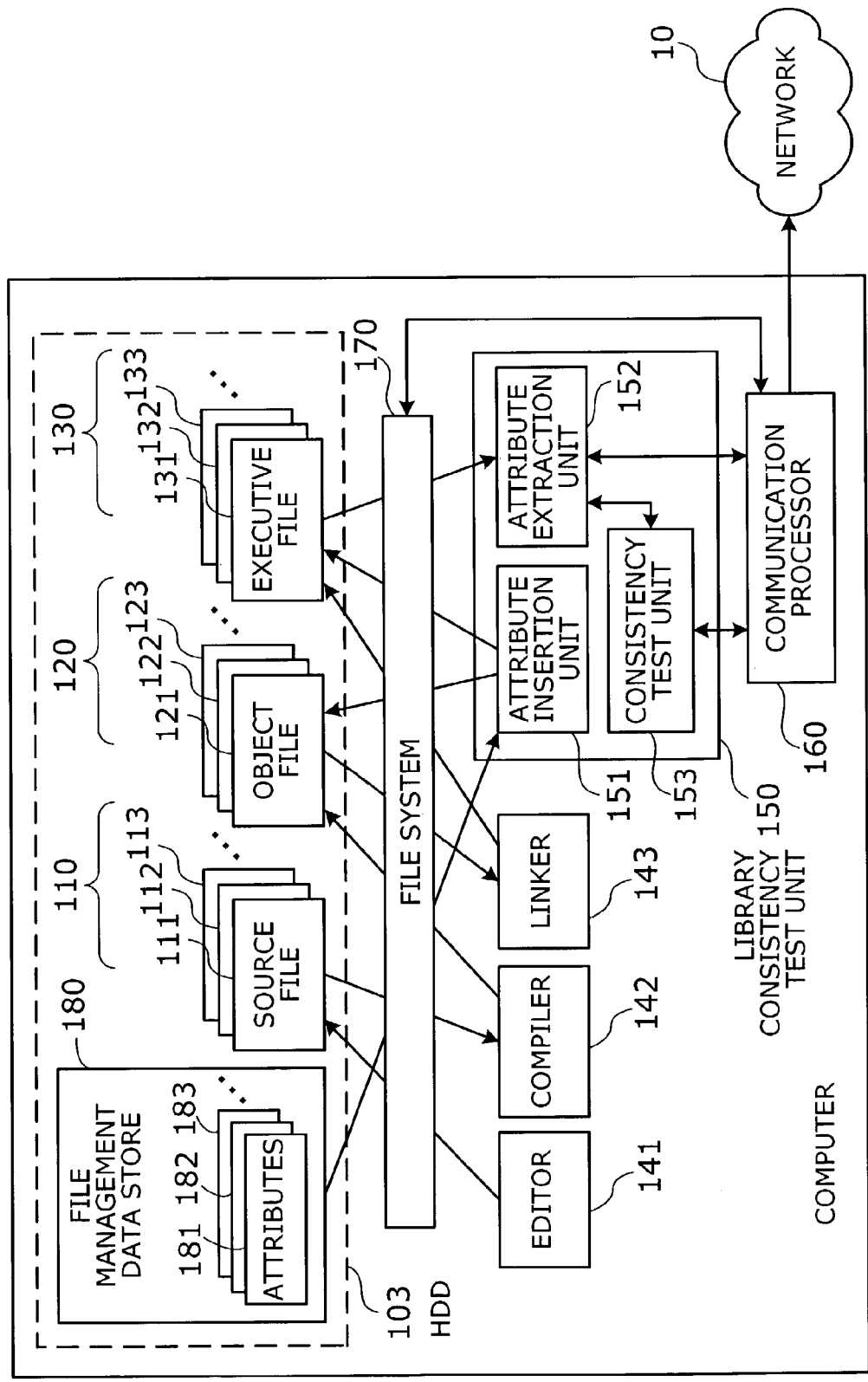
FIG. 4 is a block diagram which shows various processing functions implemented on a computer system according to the present embodiment.

FIG. 4 is a block diagram showing processing functions that the computer 100 provides according to present embodiment. Here the computer 100 contains the following functional elements: a plurality of source files 111, 112, 113, and so on (collectively referred to by the numeral "110"), a plurality of object files 121, 122, 123, and so on (collectively referred to by the numeral "120"), a plurality of executive files 131, 132, 133, and so on (collectively referred to by the numeral "130"), an editor 141, a compiler 142, a linker 143, a library consistency test unit 150, a communication processor 160, a file system 170, and a file management data store 180.

Source files 110 describe a process in the form of code script (source code) written in an appropriate programming language. Object files 120 describe a process in the form of specific machine code that can be executed by the computer 100. Executive files 130 are machine code files each created by linking one or more object files together into one file. Those executive files are also called "load modules," which can immediately be loaded onto and executed by the computer 100. All the above source, object, and executive files are stored in the HDD 103.

The editor 141 is a tool for the user to write and edit source codes. With this editor 141, the programmer types in a script of instructions using an appropriate programming language. When he/she gives a save command to the editor 141, it writes the resulting source file into the HDD 103 via the file system 170.

The compiler 142 is piece of software that generates a machine code from a given source script. It makes access to the HDD 103 to read out a source file specified by a programmer, parses each line of source code in the file, and translates them into a machine code that the computer 100 can understand. This process is known as the program compilation, and the outcome of compilation is called an "object code." The compiler 142 saves a compiled object code into the HDD 103 as an object file.

The linker 143 makes access to the HDD 103 to read out one or more object files specified by the user. The linker 143 then combines those object codes together into a single load module, while editing some portions so that they will be organized as a consistent series of instructions. This process is known as the linking. The linker 143 saves a linked load module into the HDD 103 as an executive file.

The library consistency test unit 150 tests the consistency among library resources, including: source files, object files, and executive files. This test determines whether the original source of a given executive file or a given object file is identical with the latest version of that source. More specifically, the library consistency test unit 150 inserts some additional information to the object files 120 and executive files 130 when building a library, so that they will be ready for future consistency management. According to the present embodiment, the following file attribute information is inserted for test purposes: file location (including file name and file path), last modified date, and file size of the original source of each file. As already explained, the original source of an object file 120 is a source file 110, and the original source of an executive file 130 is object files 120.

In response to a consistency test request, the library consistency test unit 150 examines the attribute record field (describe later) of an object file 120 or executive file 130 that is specified as the test subject. To achieve a test, the library consistency test unit 150 comprises the following elements: an attribute insertion unit 151, an attribute extraction unit 152, and a consistency test unit 153. When an object file 120 is created from a source file 110, the attribute insertion unit 151 adds the attributes of that original source file 110 to the created object file 120. Likewise, when an executive file 130 is created from an object file 120, the attribute insertion unit 151 adds the attributes of that original object file 120 to the created executive file 130.

More specifically, the attribute insertion unit 151 is activated when the compiler 142 has finished its compilation task. It first makes access to the file management data store 180 to obtain file attributes of the source file of interest and then appends them to the compiled object file, so that the object code will be followed by a record of its original source. This record is thus called a "source file attribute record." Lastly, the attribute insertion unit 151 saves the object file with a source file attribute record into the HDD 103.

The attribute insertion unit 151 is activated also when the linker 143 has finished its link operation. It first makes access to the file management data store 180 to obtain attributes of the object files of interest and then appends them to the produced executive file, so that the load module will be followed by the record of its original object files. This record is thus called an "object file attribute record." Lastly, the attribute insertion unit 151 saves the executive file with an object file attribute record into the HDD 103.

The file location information is composed of a path name and file name that is retrieved from the file management data store 180. The attribute insertion unit 151 adds the computer 100's node name to the above, when producing an attribute record. Here, node names are unique labels assigned to individual computers on a network 10 to distinguish them from each other.

The attribute extraction unit 152 extracts an attribute record from a specified file in response to an attribute record request from the consistency test unit 153 of the computer 100 itself or that of other computers. More specifically, the attribute extraction unit 152 responds to an attribute record request by reading out a specified object file or executive file from the HDD 103 and extracting data in its attribute record field. If the specified file is an executive file, an object file attribute record will be extracted. Or if it is an object file, a source file attribute record will be extracted. The attribute extraction unit 152 then sends the extracted attribute record back to the consistency test unit 153 of the requesting computer.

As already mentioned, the consistency test unit 153 sends an attribute record request to the attribute extraction unit 152 when a consistency test request about a specific file is received from the user. Note that the destination of this attribute record request may not always be the consistency test unit 153 in the local computer, but can be that in a remote computer, depending on which computer has the original source of the file in question. When the requested attribute record is supplied from the attribute extraction unit 152, the consistency test unit 153 extracts file location information from the record and obtains current attributes of a file that is found in the place indicated by that file location information. The consistency test unit 153 then compares those current attributes with the above attribute record, thereby testing their consistency. To output the result of comparison, the consistency test unit 153 composes a summary report and, if necessary, an alarm report. A summary report contains a list of files that the library consistency test unit 150 has examined, and an alarm report includes a description of files that have failed in the consistency test.

The communication processor 160 enables the computer 100 to interact with other computers 200, 300, and 400 on the network 10, using the hypertext transfer protocol (HTTP), for example. More specifically, the communication processor 160 receives an attribute record request from some other computer and passes it to the attribute extraction unit 152. When the requested attribute record is supplied afterwards from the attribute extraction unit 152, the communication processor 160 delivers it to the requesting computer over the network 10.

The communication processor 160 also relays a file attribute request that is addressed from the local consistency test unit 153 to some other computer. When the requested file attributes are delivered from that remote computer, the communication processor 160 passes them to the consistency test unit 153. Yet another task of the communication processor 160 is to handle file attribute requests from other computers. When a remote computer requests file attributes of a local file in the HDD 103, the communication processor 160 passes that request to the file system 170. The requested attributes are supplied from the file system 170 to the requesting computer via the communication processor 160.

The file system 170 manages the location of every file in the HDD 103. Such management information is stored in a file management data store 180, which is also a part of the HDD 103. The file system 170 is coupled to the editor 141 and library consistency test unit 150 to control their file access operations. That is, any read or write access to source files 110, object files 120, and executive files 130 in the above-described processes is performed with the intervention of the file system 170. The file system 170 also serve requests from the compiler 142, linker 143, and communication processor 160, providing them with attributes of a specified file.

The file management data store 180 is a storage space in the HDD 103 to record the locations and other information about files stored in the HDD 103, including each file's attributes 181, 182, 183, and so on.

Referring now to FIGS. 5 to 8, we will describe the structure of data stored in the computer 100. Source files 110 are text files each describing a particular computer-implemented process in a programming language (e.g., C Language). Object files 120 and executive files 130, on the other hand, are binary files formatted in, for example, the Executable and Linkable Format (ELF), an object file format commonly used by various operating systems.

Figure 5:
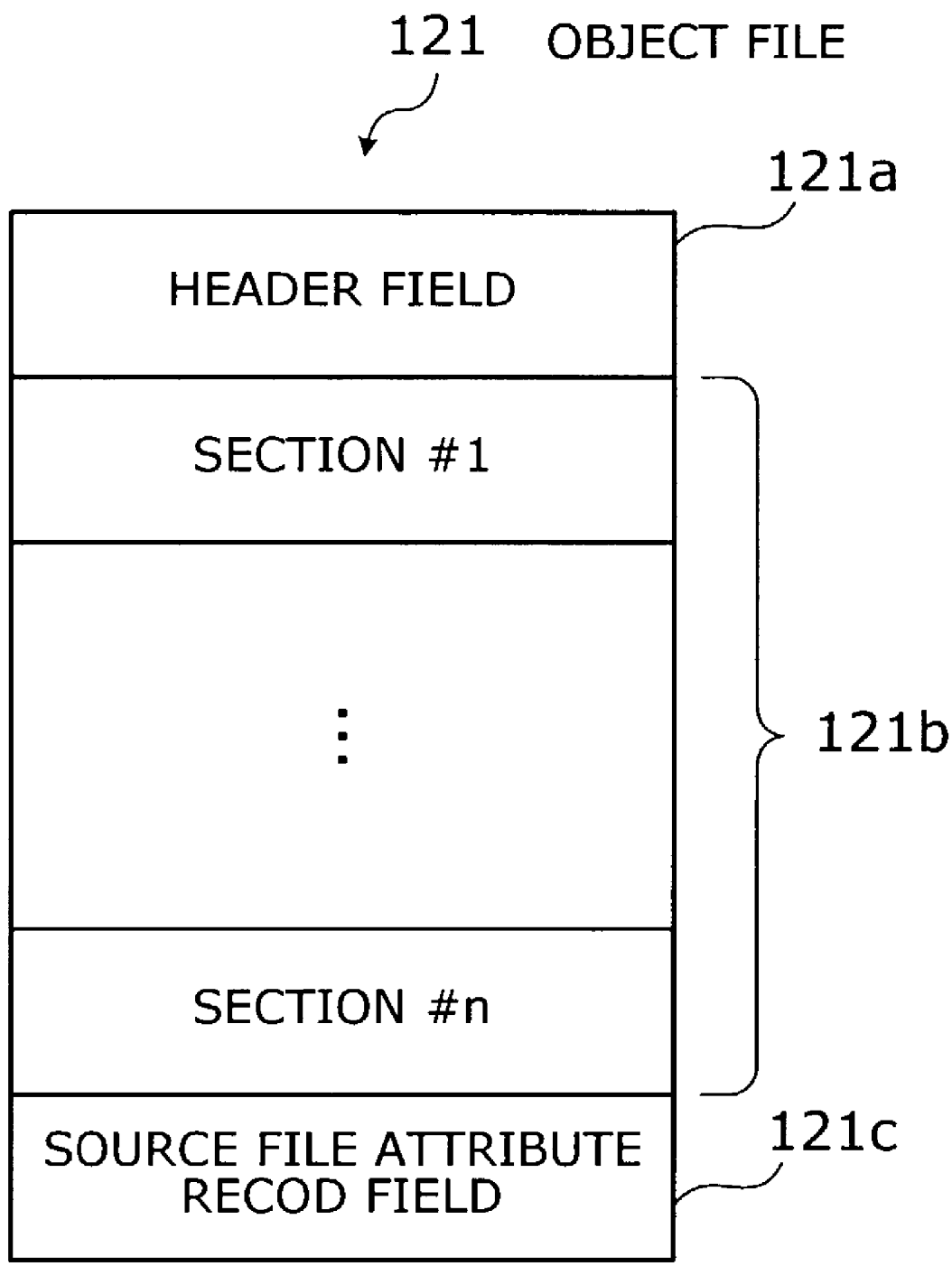
FIG. 5 shows a typical data structure of object files.

FIG. 5 shows a typical data structure of object files according to the present invention. An object file 121 consists of a header field 121*a,* a plurality of sections #1 to #n 121*b,* and a source file attribute record field 121*c.* The header field 121*a* contains management data (header information) of the object file 121. The sections 121*b* contain symbols, program instructions, and other data produced in a compilation process. The source file attribute record field 121*c* contains a source file attribute record of the object file 121.

Figure 6:
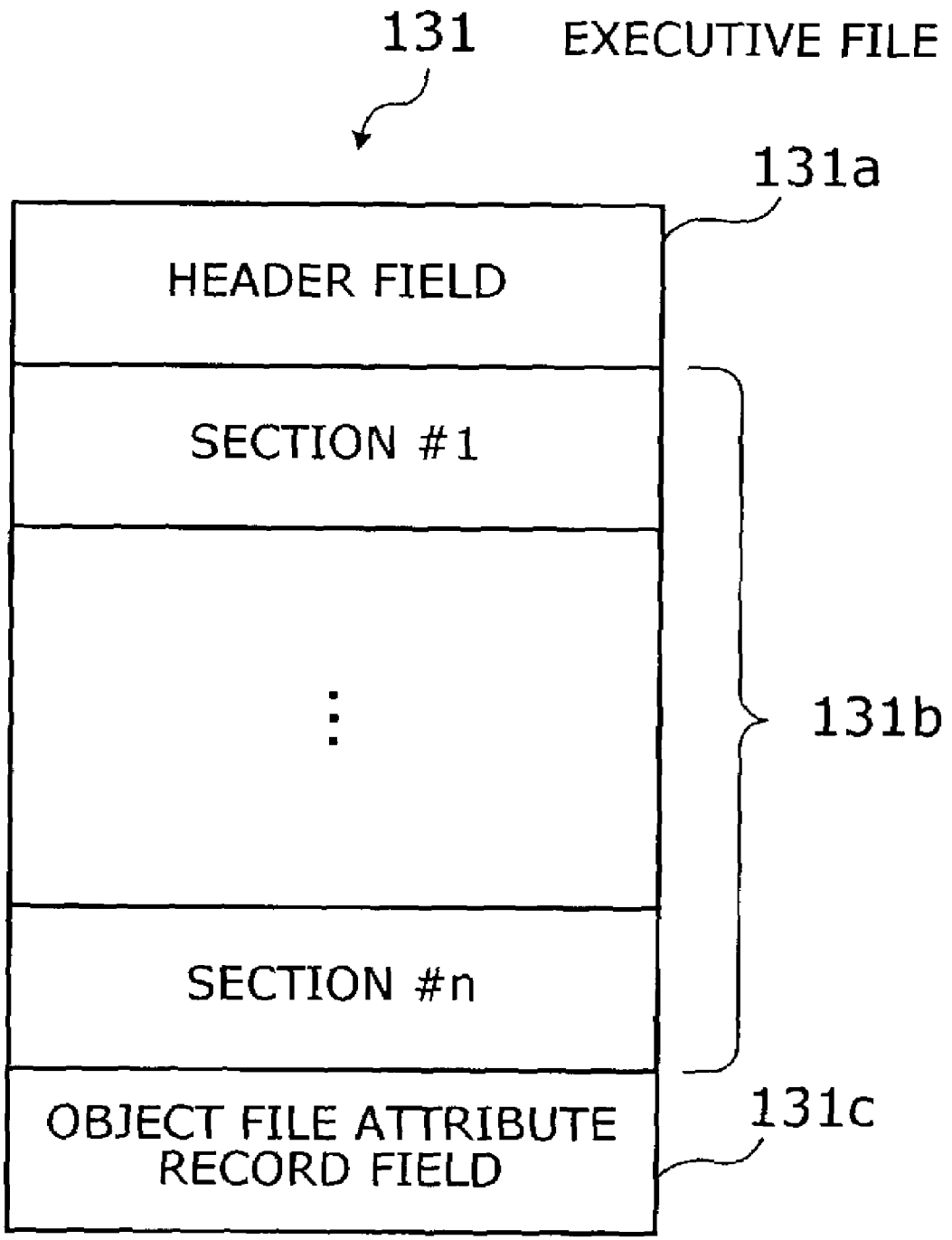
FIG. 6 shows a typical data structure of executive files.

FIG. 6 shows a typical data structure of executive files according to the present invention. An executive file 131 is composed of a header field 131*a,* a plurality of sections #1 to #n 131*b,* and an object file attribute record field 131*c.* The header field 131*a* contains management data (header information) of the executive file 131. The sections 131*b* contain symbols, program instructions, and other data produced in a linking process. The object file attribute record field 131*c* contains an object file attribute record of the executive file 131.

Attribute records added to an object or executive file can be structured according to a standard document format such as the Extensible Markup Language (XML). In this case, the attribute insertion unit 151 generates XML tags to indicate the type of element for each item of attributes 181, 182, 183, and so on.

FIG. 7 shows structuring rules used to build an attribute record in the XML format. Specifically, the table in FIG. 7 provides the description and data format of each XML element.

Element "xml" represents the body of an XML text string. That is, the text between XML tags <xml> and </xml> is interpreted as XML-structured data. Element "xml" actually contains elements "source" and "object."

Element "source" represents the attributes of a source file. That is, the text between XML tags <source> and </source> shows source file attributes. Element "source" actually contains elements "url," "timestamp," and "size."

Element "object" represents the attributes of an object file. That is, the text between XML tags <object> and </object> shows object file attributes. Element "object" actually contains elements "url," "timestamp," and "size."

Element "url" represents the file location of a source file or object file. According to the present embodiment, the location of each file in the library resources is specified in the form of Uniform Resource Locator (URL). That is, the text between XML tags <url> and </url> is interpreted as a file locator written in URL form.

Element "timestamp" represents the last modified date of a source file or object file. That is, the text between XML tags <timestamp> and </timestamp> is interpreted as a last modified date. It is expressed in the format of "YYYY/MM/DD hh:mm:ss," where YYYY=year, MM=month, DD=day of month, hh=hours, mm=minutes, and ss=seconds.

Element "size" represents the size of a source file or object file. That is, the text between XML tags <size> and </size> is interpreted as a file size expressed in decimal numbers. The file size is measured in bytes.

The attribute insertion unit 151 produces attributes in the XML format according to the structuring rules shown in FIG. 7. Likewise, the consistency test unit 153 uses the above rules to identify each XML element (e.g., file location, last modified date, file size, etc).

Figure 8:
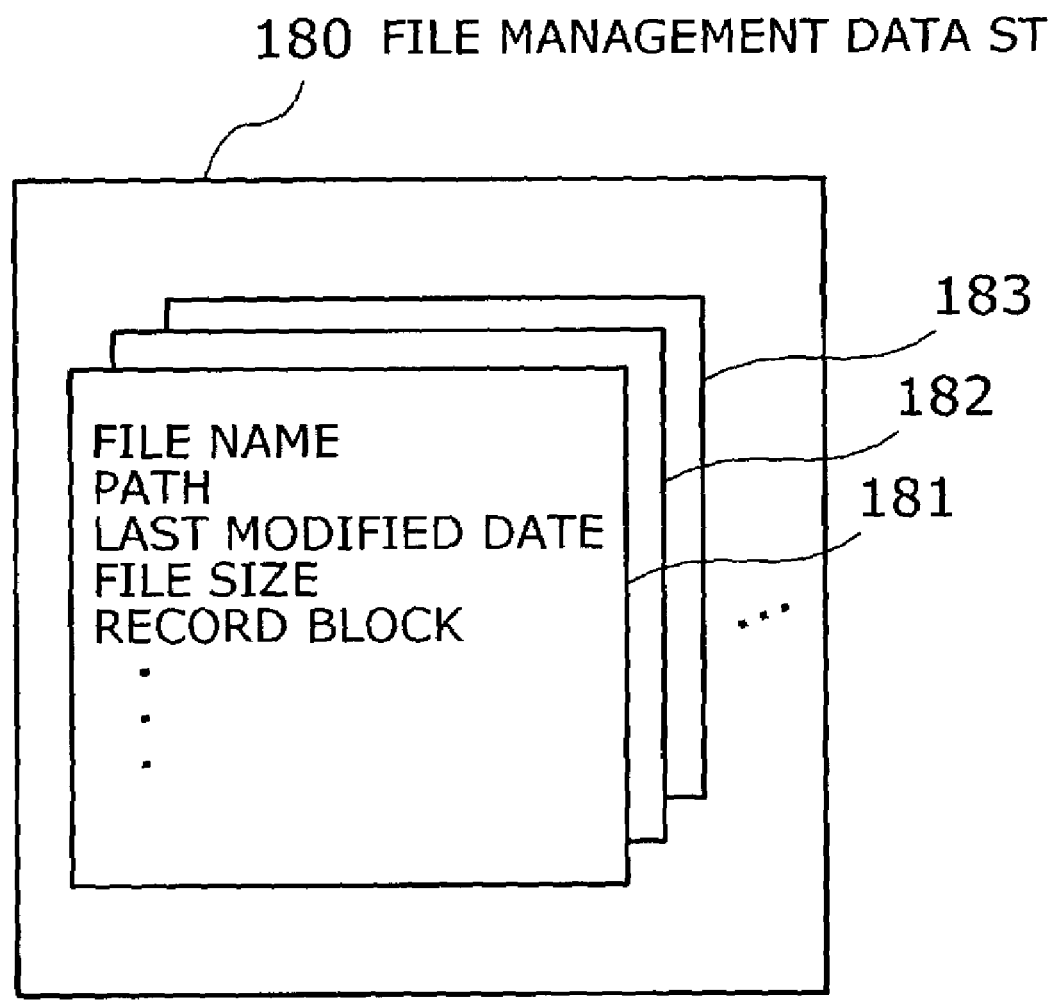
FIG. 8 shows a typical data structure of a file management data store.

FIG. 8 shows a typical data structure of the file management data store 180. The HDD 103 contains various files, and the file management data store 180 accommodates their attributes 181, 182, 183, and so on, each set of which includes the following items: "FILE NAME," "PATH," "LAST MODIFIED DATE," "FILE SIZE," and "RECORD BLOCK." FILE NAME is assigned to every file to distinguish individual file instances from each other, the uniqueness of which, however, may only be within a directory where the files reside. PATH is a piece of information that indicates the location of a file in the file system's directory structure. LAST MODIFIED DATE is a timestamp that indicates when the file of interest was modified or updated most recently. FILE SIZE means the amount of data capacity, and RECORD BLOCK shows where in the HDD 103 the file is recorded.

The above structure of the file management data store 180 in FIG. 8 is simplified for easy understanding of the present embodiment. In some actual implementations of file systems, the path of a file may not be readily available, but only a relative position (or parent-child relationship) of that file in the directory structure is defined, instead. If this is the case, one can identify the file path by tracing the directory tree up to its root, referring to the parent-child relationships between directories.

Also, some file systems store the file name information not in the attribute area of individual files, but in that of their parent directories. In this case, a file and its name are associated via the identifier of that file, such as i-node numbers in UNIX (registered trademark of The Open Group) operating system. This also applies to the association between a file and its attributes (including last modified date and file size).

With the above-described structural arrangement, the computer 100 manages its local library resources, providing a function to determine whether each executive code in that library is based on the latest version of source files and object files. We will now describe in detail how the computer system of FIG. 4 performs library resource management according to the present invention.

Figure 9:
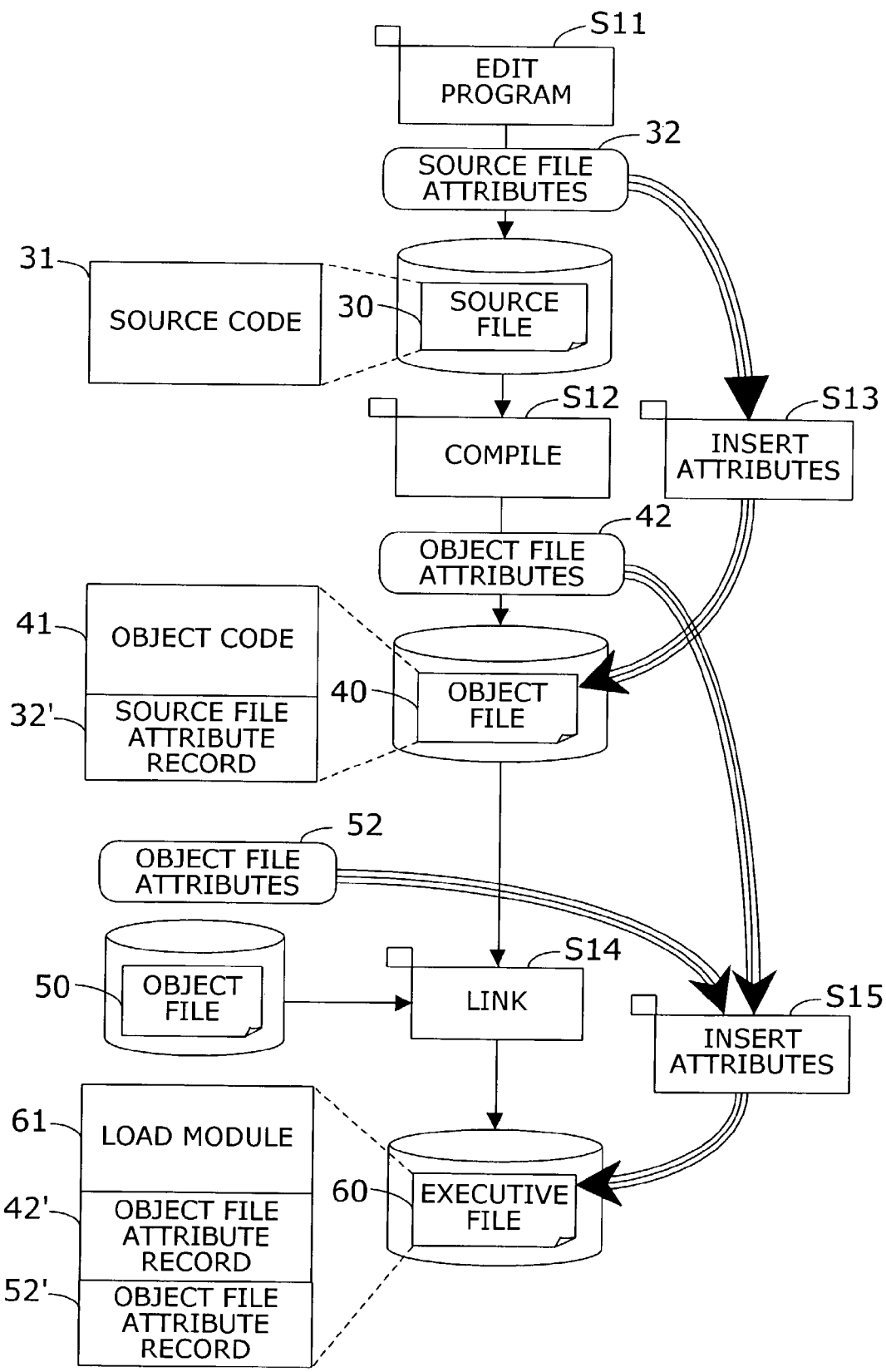
FIG. 9 shows the concept of how an executive file is produced.

FIG. 9 shows a process of generating an executive file. This process starts with a programming task in which the user writes a program script with the editor 141 (step S11). As the outcome of this step, the editor 141 creates a source file 30 containing a source code 31, and the file system 170 puts its file attributes 32 in the file management data store 180. We call this "source file attributes."

Suppose that the user now gives a command to the computer 100 to compile the source file 30. This command triggers the compiler 142 to convert the specified source file 30 into a sequence of computer-executable instructions (object code 41), thus producing an object file 40 (step S12). In this compilation step, the attribute insertion unit 151 consults the file management data store 180 to retrieve source file attributes 32 corresponding to the source file 30. It inserts the retrieved source file attributes 32 into the compiled object file 40 (step S13), so that the object code 41 will be stored in the HDD 103 together with its source file attribute record 32'. At the same time, the file system 170 saves attributes of the object file 40 itself as a new entry of the file management data store 180, which is referred to as the object file attributes 42.

Consider here that the user directs the computer 100 to link the above object file 40 with another object file 50. The linker 143 is thus activated to combine the two object files 40 and 50 into a load module 61. This load module 61 is then saved in the HDD 103 as an executive file 60 (step S14), at which time the attribute insertion unit 151 consults the file management data store 180 to retrieve the attributes 42 of the first object file 40, as well as the attributes 52 of the second object file 50. The attribute insertion unit 151 then inserts these object file attributes 42 and 52 (step S15), which results in the executive file 60 containing a single load module 61 and two sets of object file attribute records 42' and 52'. Through the above steps of FIG. 9, the computer 100 creates object files and executive files with a record of their original source.

Figure 10:
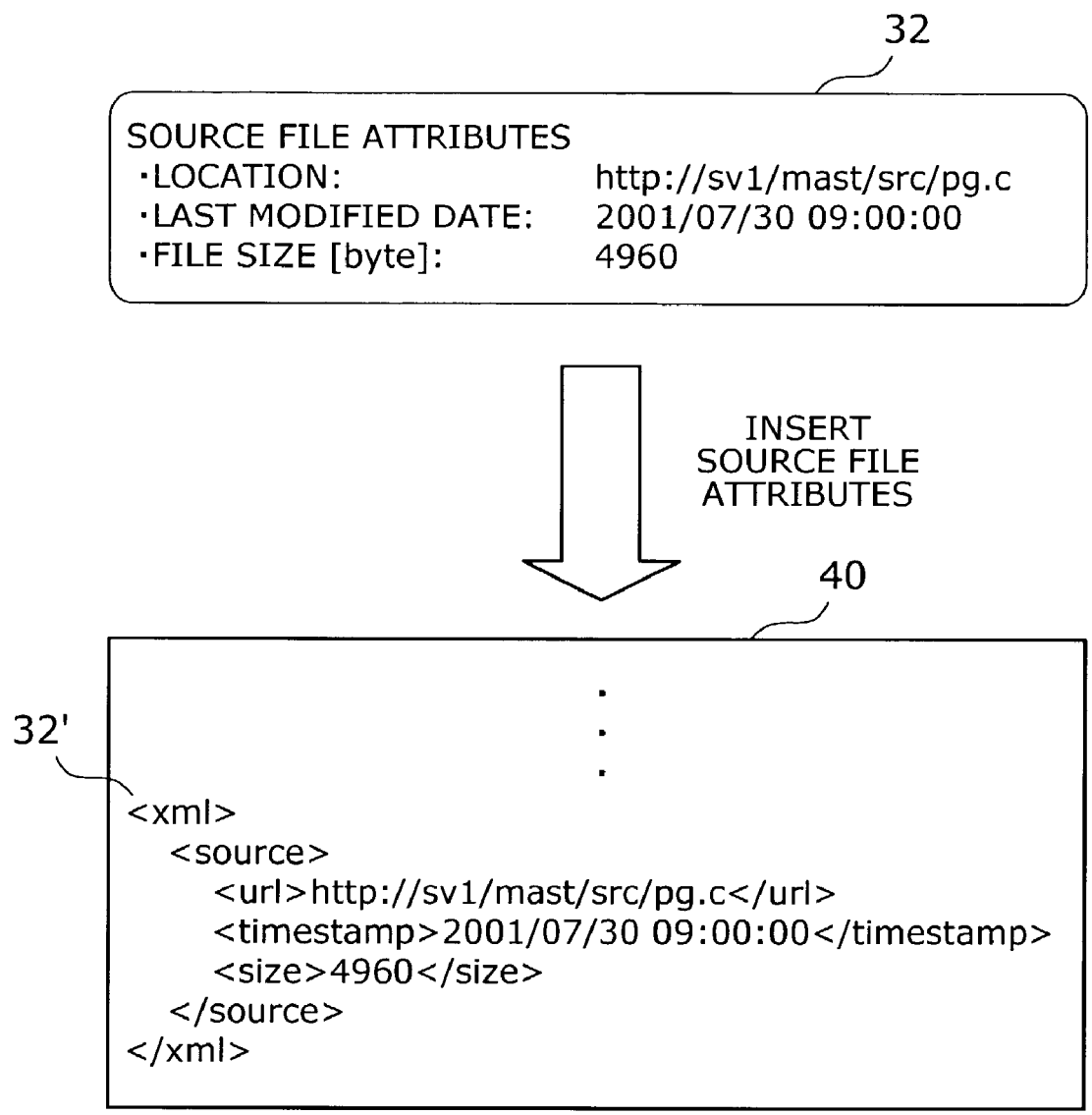
FIG. 10 shows an example of how a source file attribute record is inserted.

FIG. 10 shows an example of how source file attributes are inserted. In this example, the source file attributes 32 include the following items: location, last modified date, and file size. The location of the source file 30 is expressed in URL form, which reads <"http://sv1/mast/src/pg.c">. That is, the scheme is "http," the server name (node name) is "sv1," the path within the server is "mast/src," and the file name is "pg.c." The last modified date "2001/07/30 09:00:00" indicates that the source file 30 was last updated in 9 a.m. on Jul. 30, 2001. The current file size is 4690 bytes.

Each item of the above source file attributes 32 is converted into XML-formatted text data and appended to the binary object code in the object file 40. In the example of FIG. 10, the entire text of XML-formatted attributes is placed between two XML tags <source> and </source>. This is referred to as the source file attribute record 32', which includes the following items: file location with <url> tags, and last-modified-date timestamp with <timestamp> tags, and file size value with <size> tags.

Figure 11:
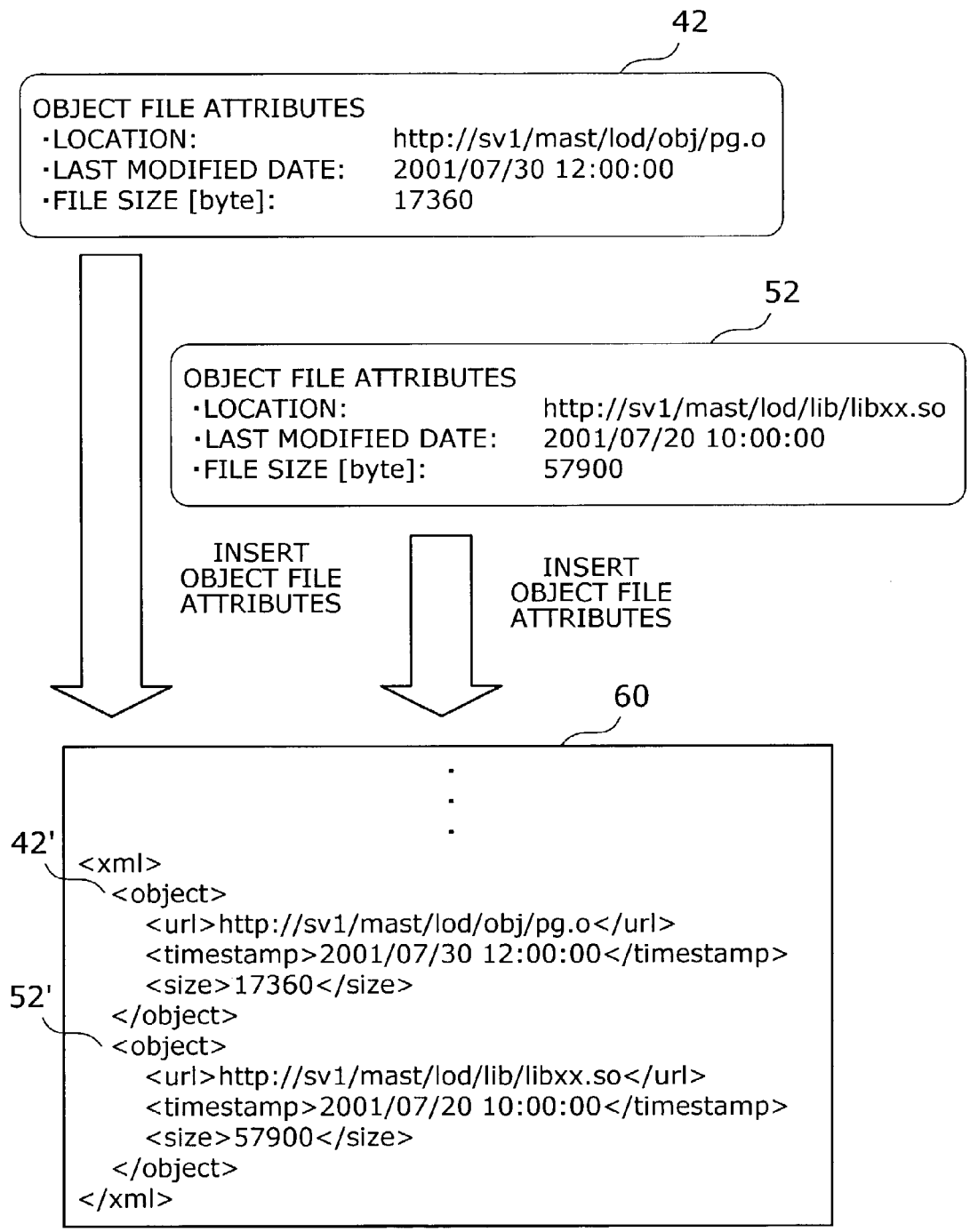
FIG. 11 shows an example of how an object file attribute record is inserted.

FIG. 11 shows an example of how object file attributes are inserted. There are two sets of object file attributes 42 and 52 in this example, since the executive file 60 of interest is created from two object files 40 and 50. The first object file attributes 42 include the following items about the first object file 40: location, last modified date, and file size. The attributes 42 show us that the first object file 40 is located at <"htt://sv1/mast/lod/obj/pg.o"> last updated at "2001/07/30 12:00:00" (12 a.m. on Jul. 30 and 2001), and 17360 bytes in size.

Similar to the above, the second object file attributes 52 include the following items about the second object file 50: location, last modified date, and file size. In the example of FIG. 11, they show us that the second object file 50 is located <"http://sv1/mast/lod/lib/libxx.so"> last updated at "2001/07/20 10:00:00" (10 a.m. on Jul. 20 and 2001), and 57900 bytes in size.

The object file attributes 42 and 52 explained above are then converted into XML-formatted text data and appended to the binary load module in the executive file 60. As shown in the lower half of FIG. 11, two object file attribute records 42' and 52' are each inserted between <object> and </object> tags, where the following tagged elements are included: file location with <url> tags, and last-modified-date timestamp with <timestamp> tags, and file size with <size> tags.

As can be seen from FIGS. 10 and 11, the use of XML format permits attribute information to be described in a classified manner, each data item being identified with a distinct label showing its data type (e.g., location, last modified date, and file size). While the XML elements presented in FIGS. 10 and 11 are visually organized with tabulations and line feeds for easy reading, those formatting codes may not be included in actual implementations of those XML documents.

Figure 12:
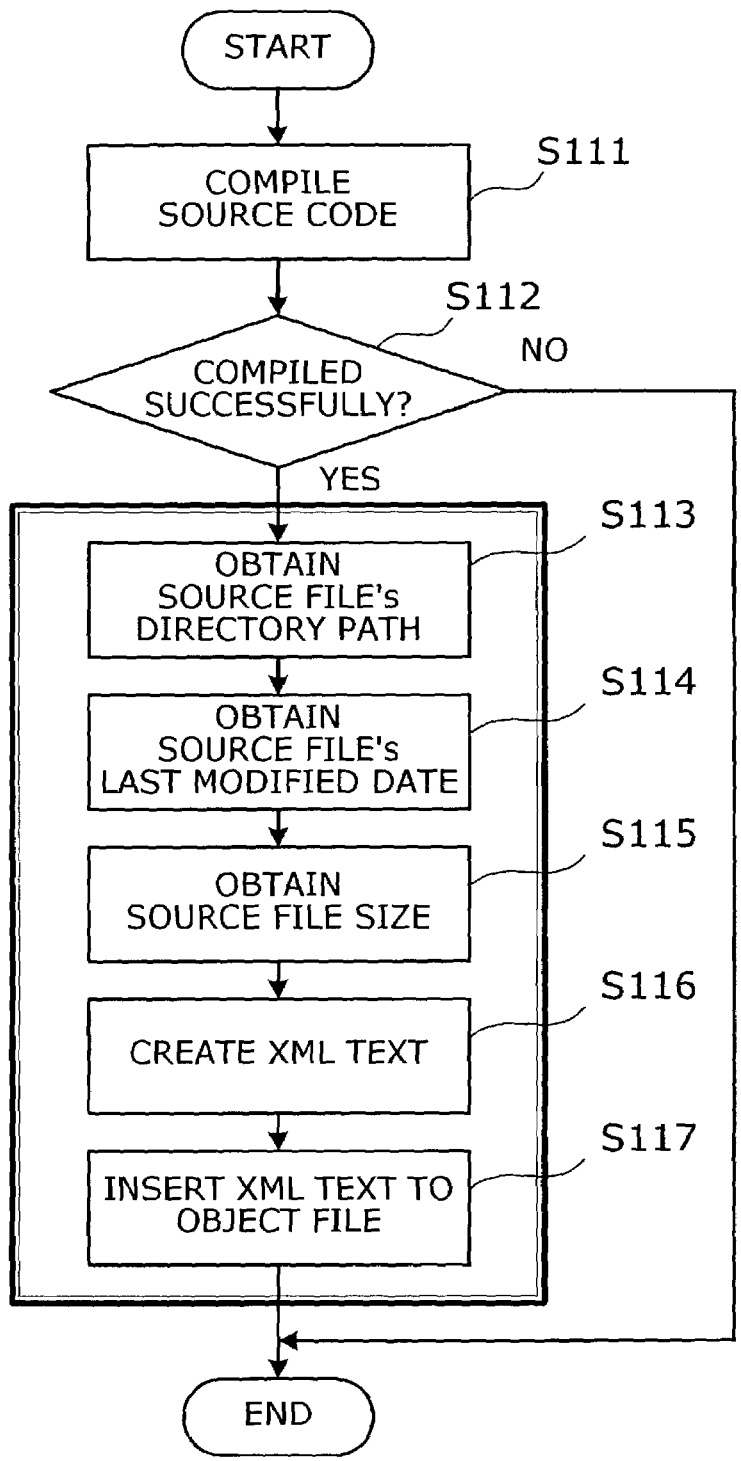
FIG. 12 is a flowchart of a process of producing an object file.
Figure 13:
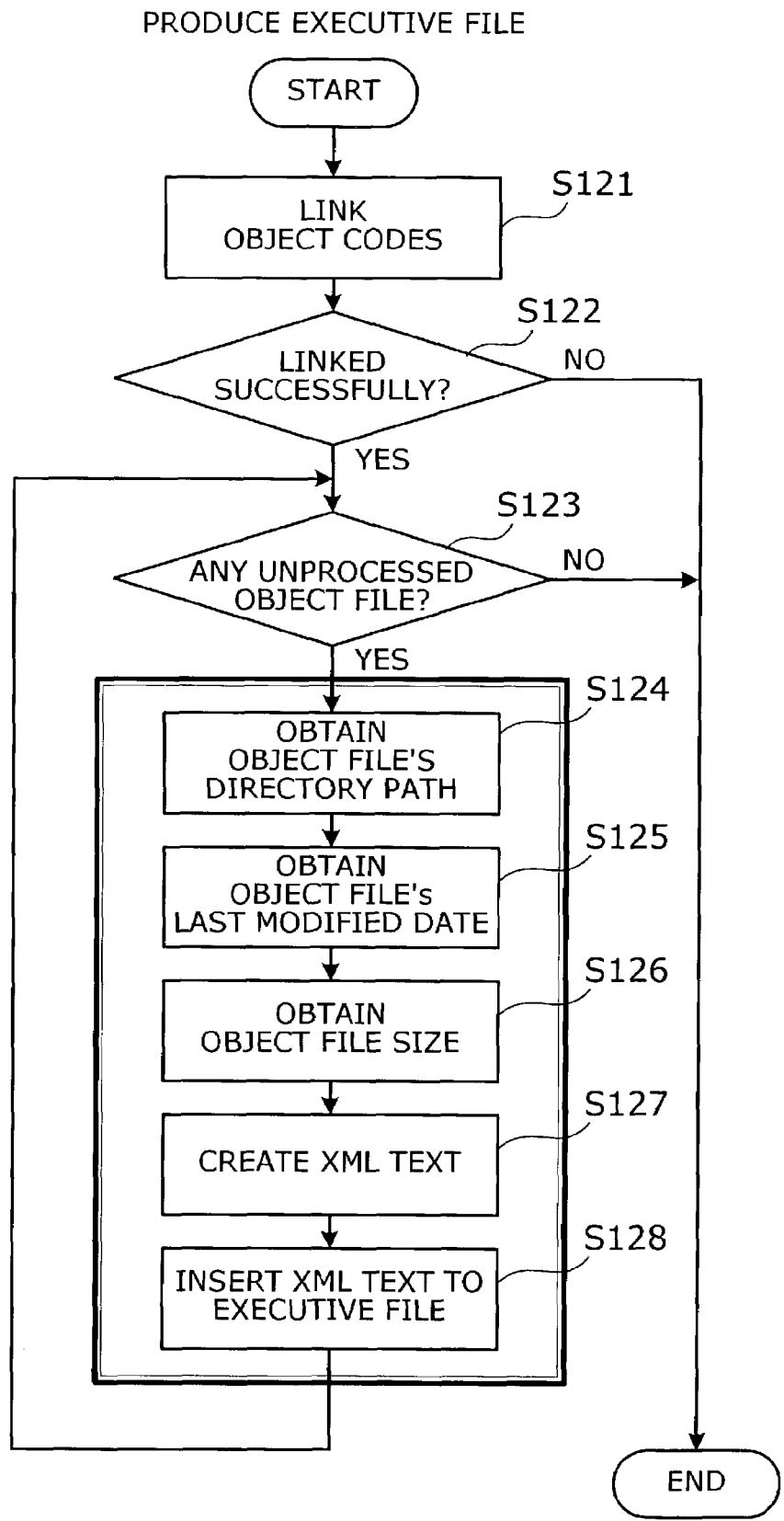
FIG. 13 is a flowchart of a process of producing an executive file.

In the next section, we will elaborate the process shown in FIG. 9, with reference to FIG. 12 for object file generation, and FIG. 13 for executive file generation.

FIG. 12 is a flowchart of a process of producing an object file from a source file. This process is invoked when the user issues, for example, a compilation command for a specific source file. It is assumed here that the user is requesting the computer 100 to create an object file, but not an executive file directly from the specified source code. The flowchart of FIG. 2 includes the following steps:

(S111) The compiler 142 translates a source code in a specified source file into an object code, or a sequence of instructions that the computer 100 can understand. The compiler 142 creates an object file to store the compiled object code.

(S112) The compiler 142 determines whether the compilation has completed successfully. Here, it neglects link errors (there is no other object files to be linked). If successful, the process advances to step S113. If not, the process has to be terminated with a negative result.

(S113) The attribute insertion unit 151 obtains a directory path to the source file, referring to that file's attributes stored in the file management data store 180. It then adds the scheme name (e.g., "http"), server name, and file name to that directory path, thereby creating a complete URL that indicates where the source file is saved.

(S114) Consulting again the source file attributes, the attribute insertion unit 151 obtains the source file's last modified date.

(S115) From the same attributes, the attribute insertion unit 151 obtains the source file's file size.

(S116) Now that the source file's URL, last modified date, and file size are determined at steps S113 to S115, the attribute insertion unit 151 puts them into an XML text string, adding appropriate tags to each data element.

(S117) The attribute insertion unit 151 attaches the XML test string created at step S116 to the end of the object code created at step S111, thus completing the process of producing an object file.

FIG. 13 is a flowchart of a process of producing an executive file from object files. Invoked by, for example, the user's link command for specific object files, this process is executed according to the following steps:

(S121) The linker 143 links object codes in the specified object files together into a load module, and then it creates an executive file to store the linked load module.

(S122) The linker 143 determines whether the linking process has completed successfully. If successful, the process advances to step S123. If not, the present process has to be terminated with a negative result.

(S123) The attribute insertion unit 151 determines whether there is any object file whose attributes have not yet been subjected to the following steps S113 to S117. If there remains such an unprocessed object file, the process advances to step S124. If all the specified object files have been processed, it means that the executive file is completed.

(S124) The attribute insertion unit 151 selects one of the remaining object files and identifies its directory path from the attributes of that file. The attribute insertion unit 151 then adds the scheme name (e.g., "http"), server name, and file name to that directory path, thereby creating a complete URL that indicates where the object file is saved.

(S125) The attribute insertion unit 151 obtains the last modified date of the selected object file, consulting its attributes.

(S126) Consulting the attributes again, the attribute insertion unit 151 obtains the file size of the selected object file.

(S127) Now that the selected object file's URL, last modified date, and file size are determined at steps S124 to S126, the attribute insertion unit 151 puts them all into an XML text string, adding appropriate tags to each data element.

(S128) The attribute insertion unit 151 attaches the XML test string created at step S127 to the end of the load module created at step S121. It goes back to step S123 to process the remaining object files.

Figure 14:
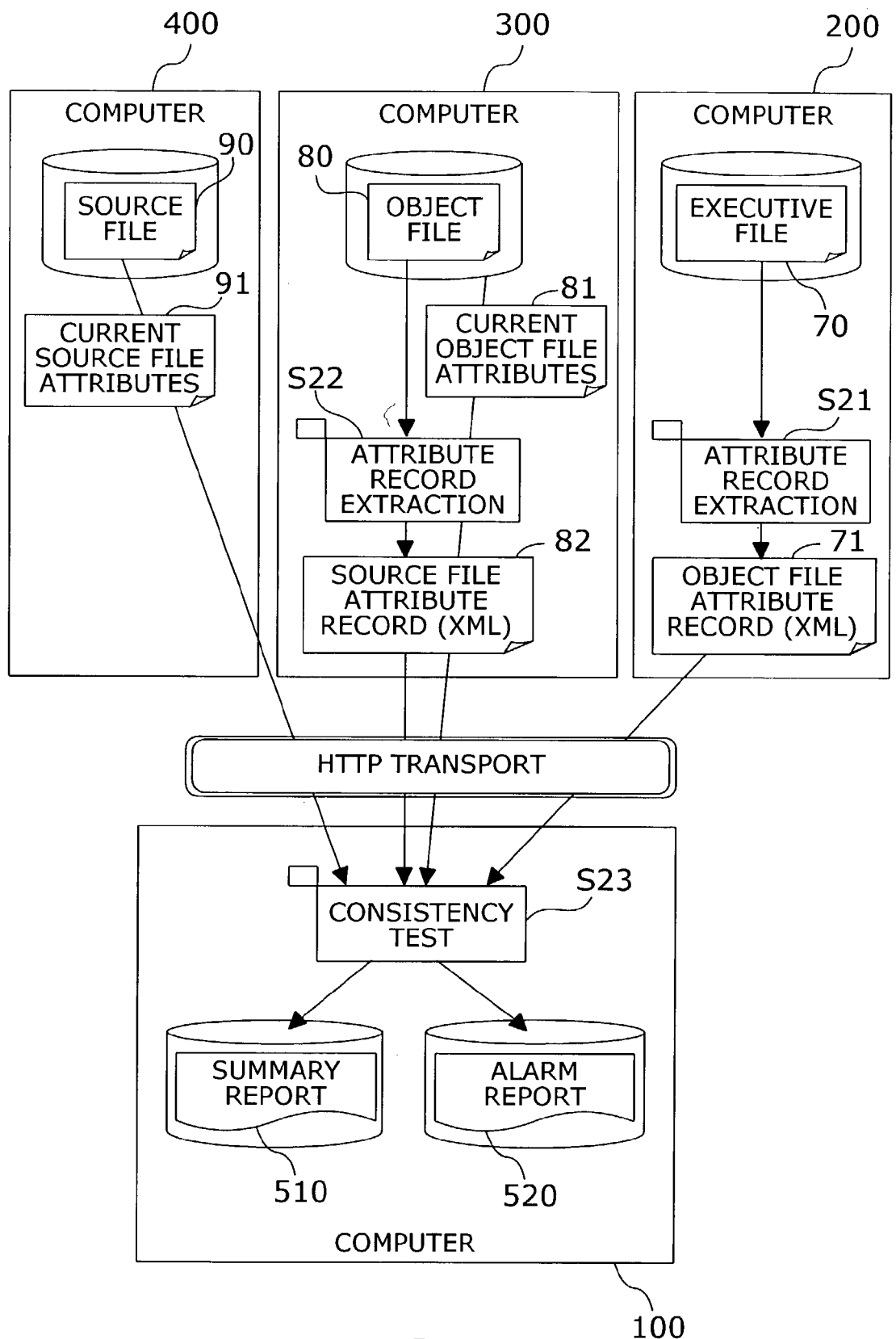
FIG. 14 is a conceptual view of an executive file consistency test.

The above steps produces an executive file containing attribute information about its original object files, and such executive files are stored for use as library resources. The present invention enables a local or remote computer to test the consistency of those library resources with respect to their original sources. Actual subjects of the consistency test includes executive files and object files. Referring now to FIG. 14, we will first explain the consistency test for executive files.

FIG. 14 is a conceptual view of an executive file consistency test. In this example, one computer 100 is attempting to check the consistency of an executive file 70 that is stored in another computer 200. It is assumed here that the executive file 70 in question was created from an object file 80 (of the current or some older version) in yet another remote computer 300. In this sense, the object file 80 in current state is referred to as a "current object file" of the executive file 70. We also assume here that the object file 80 is compiled from a source file 90 (of the current or some older version) in still another remote computer 400. In this sense, the source file 90 in current state is referred to as the "current source file" of the object file 80.

The above system tests the executive file 70 as follows. First, the attribute extraction unit in the computer 200 extracts an object file attribute record 71 from the executive file 70 itself (step S21), which is in the form of an XML text string. The extracted object file attribute record 71 is sent to the consistency test unit 153 in the computer 100 over HTTP transport. In addition, the file system in the computer 300 delivers the current attributes 81 (last modified date and file size, particularly) of the object file 80 to the computer 100 over HTTP transport. Also, the attribute extraction unit in the computer 300 extracts a source file attribute record 82 from the object file 80 (step S22). The extracted source file attribute record 82 is delivered to the consistency test unit 153 in the computer 100 over HTTP transport, and further, the file system in the computer 400 supplies the computer 100 with current attributes 91 (last modified date and file size) of the source file 90 over HTTP transport.

Inside the computer 100, the consistency test unit 153 examines the data collected from the remote computers 200, 300, and 400. More specifically, it compares the object file attribute record 71 with the current object file attributes 81 in terms of their last modified dates and file sizes. It further compares the source file attribute record 82 with the current source file attributes 91 in terms of their last modified dates and file sizes. If both comparisons show good agreement, it means that the executive file 70 reflects the latest content of its source file 90 and object file 80, and we can safely say that the executive file 70 is consistent with its original sources. Finally, the consistency test unit 153 outputs the test result as a summary report 510. If any inconsistencies (i.e., mismatch in attribute values) are found in the test, it produces an alarm report 520 to indicate them.

Figure 15:
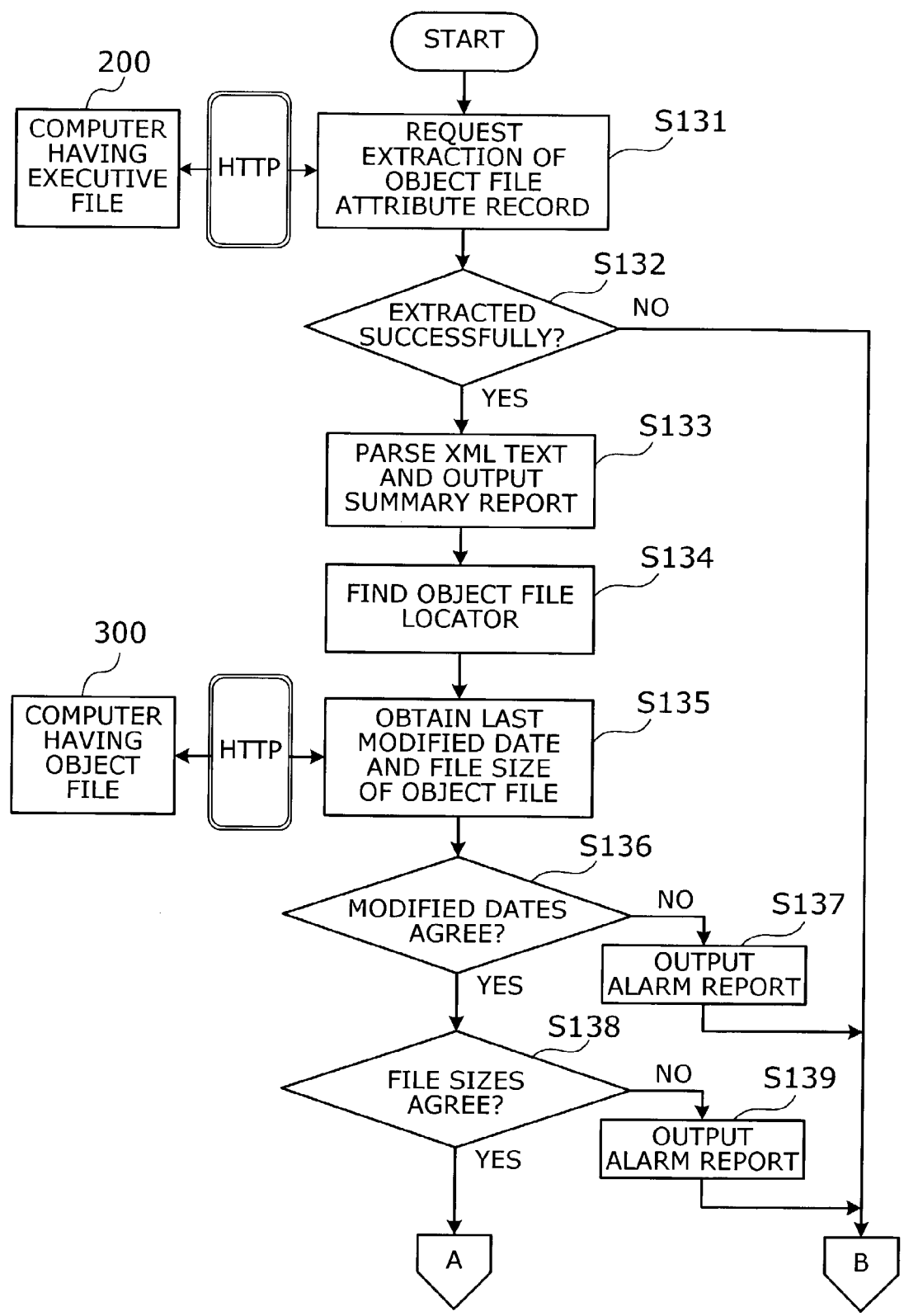
FIGS. 15 and 16 are the first and second halves of a flowchart showing an executive file consistency test.
Figure 16:
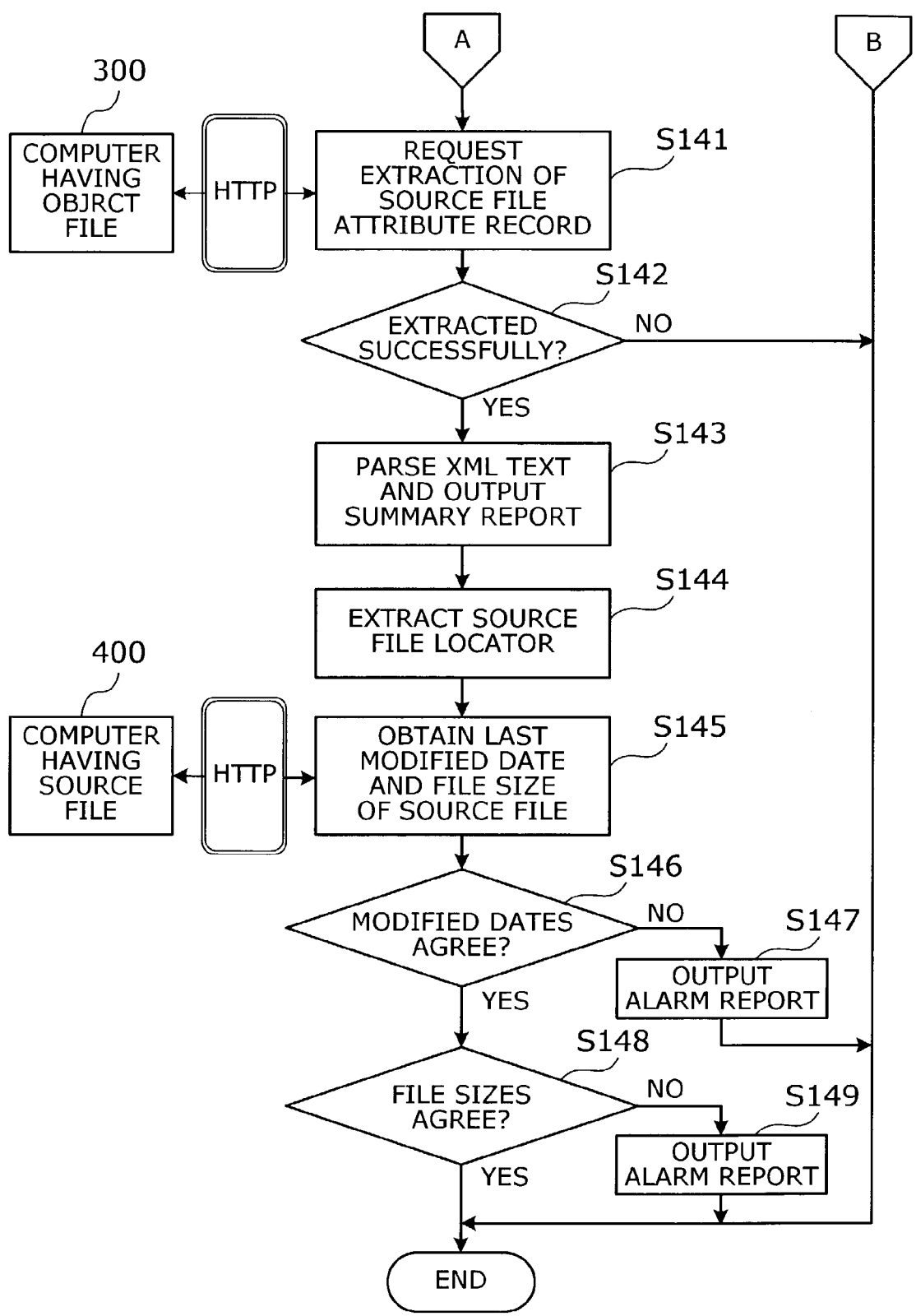

Referring to the flowchart of FIGS. 15 and 16, we will describe in detail how the computer 100 operates in the executive file consistency test outlined above. This process is invoked when, for example, the user issues a test command for a specific executive file. We assume here that the command is entered to the computer 100. The flowchart is divided into two parts; the first half of this process includes the following steps:

(S131) Since the user has specified an executive file in a remote computer 200 as the test subject, the consistency test unit 153 in the computer 100 requests the computer 200 to extract an object file attribute record from the specified file. The attribute extraction unit in the remote computer 200 then responds to this request by sending the object file attribute record back to the requesting computer 100. The consistency test unit 153 in the computer 100 receives the extracted record accordingly.

(S132) The consistency test unit 153 checks whether the object file attribute record has been extracted successfully. If so, the process advances to step S133. If not, the present process has to be terminated with a negative result.

(S133) The consistency test unit 153 parses XML text of the object file attribute record and outputs the result in a summary report.

(S134) The extracted object file attribute record includes a file locator in a field between <url> and </url> tags. The consistency test unit 153 finds this locator, which indicates where the object file is saved.

(S135) Based on the object file locator found at step S134, the consistency test unit 153 knows that the object file resides in another remote computer 300. It then requests the computer 300 to provide current attributes of that object file, particularly its last modified date and file size. The file system in the remote computer 300 handles this request and sends back the requested attributes to the requesting computer 100. The consistency test unit 153 receives the last modified date and file size from the computer 300. This interaction can be accomplished by sending, for example, a HEAD request defined in the HTTP protocol.

(S136) The consistency test unit 153 extracts the value of last modified date from the object file attribute record that it has parsed at step S133, where the last modified date is found between XML tags <timestamp> and </timestamp> in the format of "YYYY/MM/DD hh:mm:ss." The consistency test unit 153 then compares the extracted last modified date with the last modified date of the object file in question, which was obtained at step S135. If the two last modified dates agree with each other, the process advances to step S138. Otherwise, the process branches to step S137.

(S137) The consistency test unit 153 creates an alarm report to indicate the discrepancy in last modified date, thus terminating the process with a negative result.

(S138) The consistency test unit 153 extracts a file size value from the object file attribute record that it has parsed at step S133, where the object file size is a decimal number in units of bytes, found between XML tags <size> and </size>. The consistency test unit 153 then compares the extracted file size with the object file size obtained at step S135. If the two file sizes agree with each other, the process advances to step S141. Otherwise, the process branches to step S139.

(S139) The consistency test unit 153 creates an alarm report to indicate the discrepancy in file size, thus terminating the process with a negative result.

The above steps continues to the second half of the flowchart shown in FIG. 16, which includes the following steps:

(S141) Based on the object file locator found at step S134, the consistency test unit 153 knows that the object file resides in the remote computer 300. Accordingly, it requests the computer 300 to provide a source file attribute record contained in that object file. The attribute extraction unit in the remote computer 300 responds to this request by extracting and sending the source file attribute record back to the requesting computer 100. The consistency test unit 153 in the computer 100 receives the record accordingly.

(S142) The consistency test unit 153 checks whether the source file attribute record has been extracted successfully. If so, the process advances to step S143. If not, the present process has to be terminated with a negative result.

(S143) The consistency test unit 153 parses XML text of the source file attribute record and outputs the result in a summary report.

(S144) The extracted attribute record includes a source file locator in a field between <url> and </url> tags. The consistency test unit 153 finds this locator, which indicates where the source file is saved.

(S145) Based on the source file locator found at step S144, the consistency test unit 153 knows that the source file resides in yet another remote computer 400. It then requests the computer 400 to provide the current attributes of that source file, particularly its last modified date and file size. The file system in the remote computer 400 handles this request and sends the requested attributes back to the requesting computer 100. The consistency test unit 153 receives the last modified date and file size from the computer 400.

Think of, for example, a file system where the last modified date and file size are recorded in a source file header. In this case, the computer 100 can obtain those attributes of a desired source file in a remote computer by sending a HEAD request according to the HTTP protocol.

(S146) The consistency test unit 153 extracts the value of last modified date from the source file attribute record that it has parsed at step S143, where the last modified date is found between XML tags <timestamp> and </timestamp> in the format of "YYYY/MM/DD hh:mm:ss." The consistency test unit 153 then compares the extracted last modified date with the last modified date of the source file in question, which was obtained at step S145. If the two last modified dates agree with each other, the process advances to step S148. Otherwise, the process branches to step S147.

(S147) The consistency test unit 153 creates an alarm report to indicate the discrepancy in last modified date, thus terminating the process with a negative result.

(S148) The consistency test unit 153 extracts a value of file size from the source file attribute record that it has parsed at step S143, where the source file size is found as a decimal number in units of bytes, between XML tags <size> and </size>. The consistency test unit 153 then compares the extracted file size with the source file size that was obtained at step S145. If the two file sizes agree with each other, the present process ends with a positive result. Otherwise, the process branches to step S149.

(S149) The consistency test unit 153 creates an alarm report to indicate the discrepancy in file size, thus terminating the process with a negative result.

Figure 17:
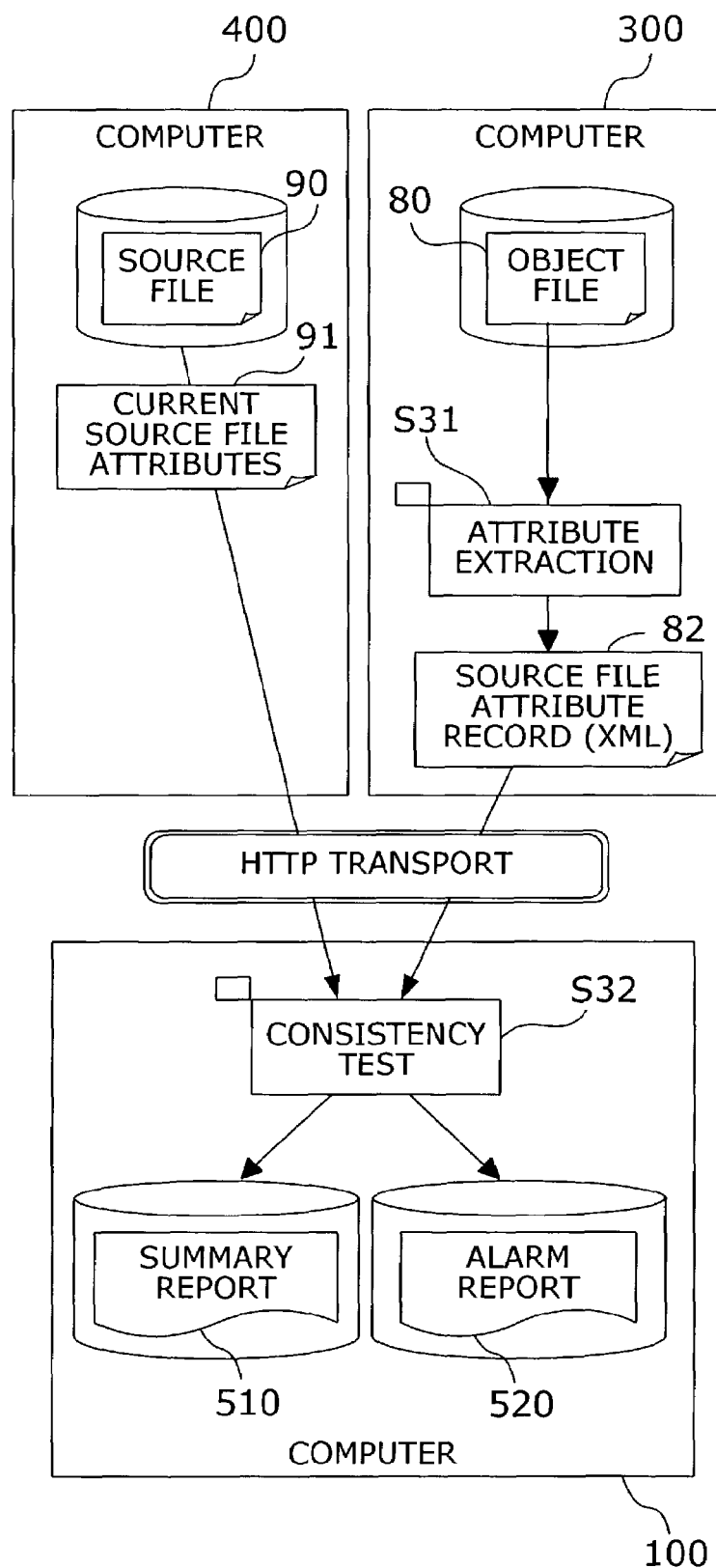
FIG. 17 is a conceptual view of an object file consistency test.

Referring next to the flowchart of FIG. 17, we will describe in detail how the computer 100 tests the consistency of a particular object file. FIG. 17 shows the concept of this type of test. Suppose that, in this example, one computer 100 is attempting to check the consistency of an object file 80 stored in another computer 300. We also assume here that the object file 80 is compiled from a source file 90 (of the current or some older version) in still another remote computer 400. In this sense, the source file 90 in current state is referred to as a "current object file" of the object file 80.

The above system tests the object file 80 in question as follows. First, the attribute extraction unit in the computer 300 extracts a source file attribute record 82 from the object file 80 itself (step S31). The extracted attribute record 82 is delivered to the consistency test unit 153 in the computer 100 over HTTP transport. In addition, the file system in the remote computer 400 supplies the requesting computer 100 with current attributes 91 (last modified date and file size, particularly) of the source file 90 over HTTP transport.

In the computer 100, the consistency test unit 153 examines the data collected from the remote computers 300 and 400. Specifically, it compares the source file attribute record 82 with the current source file attributes 91 in terms of their last modified dates and file sizes. If they agree with each other on both accounts, it means that the object file 80 under test reflects the latest content of the source file 90, and we can safely say that the object file 80 is consistent with its original source. Finally, the consistency test unit 153 outputs the test result as a summary report 510. If any inconsistencies (i.e., mismatch in attribute values) are found in the test, it further produces an alarm report 520 to indicate them.

Figure 18:
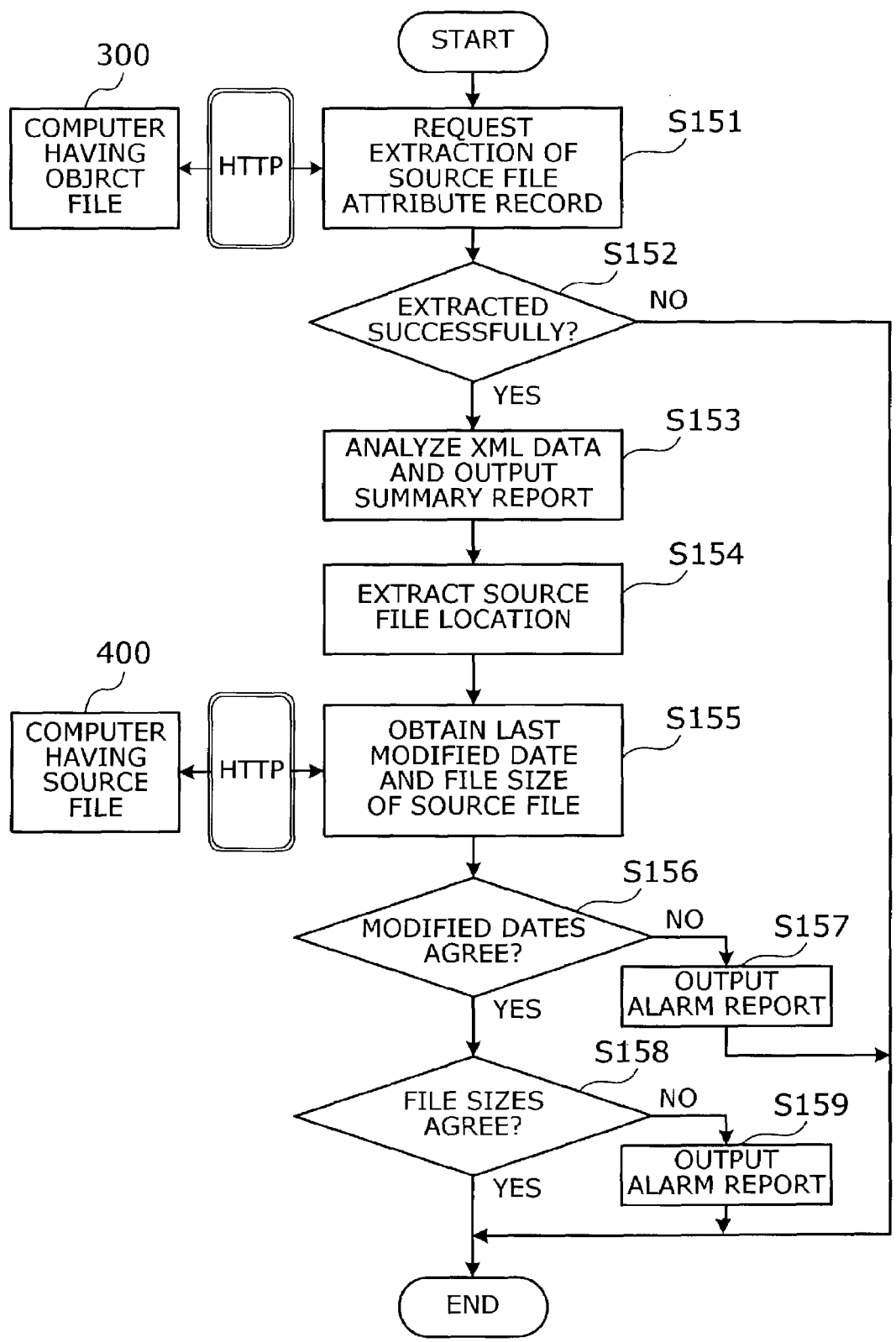
FIG. 18 is a flowchart of an object file consistency test.

Referring now to the flowchart of FIG. 18, we will describe in detail how the computer 100 operates in the object file consistency test outlined above. The process shown in this flowchart is invoked when, for example, the user issues a test command for a specific object file. We assume here that the command is entered to the computer 100. The process of FIG. 18 includes the following steps:

(S151) Since the user has specified an object file in a remote computer 300 as the test subject, the consistency test unit 153 in the computer 100 requests that computer 300 to extract a source file attribute record from the specified file. The attribute extraction unit in the remote computer 300 responds to this request by extracting and sending the source file attribute record back to the requesting computer 100. The consistency test unit 153 in the computer 100 receives the extracted record.

(S152) The consistency test unit 153 checks whether the source file attribute record has been extracted successfully. If so, the process advances to step S153. If not, the present process has to be terminated with a negative result.

(S153) The consistency test unit 153 parses XML text of the source file attribute record and outputs the result in a summary report.

(S154) The extracted source file attribute record includes a file locator in a field between XML tags <url> and </url>. The consistency test unit 153 finds this locator, which indicates where the source file is saved.

(S155) Based on the source file locator found at step S154, the consistency test unit 153 knows that the source file resides in yet another remote computer 400. It then requests the computer 400 to provide the current attributes of that source file, particularly its last modified date and file size. The file system in the remote computer 400 handles this request and sends back the requested attribute values to the requesting computer 100. The consistency test unit 153 receives the last modified date and file size from the computer 400.

Think of, for example, a file system where the last modified date and file size are recorded in a source file header. In this case, the computer 100 can obtain those attributes of a desired source file in a remote computer by sending a HEAD request according to the HTTP protocol.

(S156) The consistency test unit 153 extracts the value of last modified date from the source file attribute record that it has parsed at step S153, where the last modified date is found between XML tags <timestamp> and </timestamp> in the format of "YYYY/MM/DD hh:mm:ss." The consistency test unit 153 then compares the extracted last modified date with that of the source file of interest, which was obtained at step S155. If the two last modified dates agree with each other, the process advances to step S158. Otherwise, the process branches to step S157.

(S157) The consistency test unit 153 creates an alarm report to indicate the discrepancy in last modified date, thus terminating the process with a negative result.

(S158) The consistency test unit 153 extracts the value of file size from the source file attribute record that it has parsed at step S153, where the source file size is found as a decimal number in units of bytes, between XML tags <size> and </size>. The consistency test unit 153 then compares the extracted file size with the source file size obtained at step S155. If the two file sizes agree with each other, the present process ends with a positive result. Otherwise, the process branches to step S159.

(S159) The consistency test unit 153 creates an alarm report to indicate the discrepancy in file size, thus terminating the process with a negative result.

We have described how the proposed computer system checks consistency among files and records the result in a summary report or alarm report. Those reports comply with XML, for example, as their data format. XML permits users to define a screen layout or print form layout for browsing or printing purposes. FIG. 19 shows an example of a summary report compiled in XML form, in which the result of an executive file test is described. While we have not mentioned it so far, the user can specify a plurality of executive files as the subject of a single consistency test. To distinguish the test subjects, the system assigns an identification code to each individual executive file that is to be tested.

The executive file identification code is defined within a <program> tag. In the summary report 510 of FIG. 19, a <program> tag 511 contains an identification code of "no=1," meaning that the XML text string between this <program> tag 511 and its corresponding </program> tag shows the test results of that particular executive file. The summary report 510 has two such <program> sections, and the first <program> section includes the following elements to describe individual test items:

<name> tag 512 indicates the file name of an executive file that was tested.

<date> tag 513 indicates when the test was carried out.

<object> tag 514 marks the beginning of a test result section for an object file that was tested.

<url> tag 515 indicates the location of the object file tested.

<original> tag indicates the beginning of an object file attribute record 516 that was found in the executive file.

<current> tag indicates current attributes 517 of an original object file found in the place indicated by the above <url> element.

<source> tag 518 marks the beginning of a test result section for a source file that was tested. This section is structured in the same way as the <object> section described above.

While no mention is made of closing tags, every XML element listed above includes both an opening tag and its corresponding closing tag (e.g., <name> and </name>).

Another pair of <object> and <source> sections follow the above, showing the attributes of another object file and source file from which the executive file of interest was produced. Each section includes an original attribute record attached to the produced file, together with current attribute values found in the place indicated by a file locator. The closing tag </program> corresponding to the first <program> tag indicates the end of the test result about an executive file of present interest, and a new section 510a for another executive file starts with a second <program> tag 519.

The test system produces an alarm report in XML form, and FIG. 20 shows an example of such an alarm report. The illustrated alarm report 520 has a <program> tag 521 with an identification code indicating which executive file was tested, and the record of the failed file is found between <program> and </program>, which includes the following elements:

<name> tag 522 indicates the name of an executive file that was tested.

<date> tag 523 indicates when the test was carried out.

<object> and <source> sections 524 give attribute values of object files and source files that were tested. In the present example, one source file exhibits a discrepancy between <original> and <current> sections in terms of their last modified dates.

<msg> tag 525 is used to write a message that indicates the presence of discrepancies among related files. The example of FIG. 20 includes the following two messages: "This executive file contains an object file that has been modified," and "The source of this object file has been modified." These messages are arranged in the order that problems are detected.

As can be seen from the above explanation of the embodiment, object files are configured to include a record of last modified date and file size of their source files, so that the consistency between an object file and its corresponding source file will be tested properly. Generally the "last modified date" attribute of a file is updated each time the file is modified. Any change made to a source file after it is used to compile an object code can therefore be detected by comparing the recorded last modified date with the current value of the last-modified-date attribute of that source file. That is, mismatched last modified dates indicate that the object file in question is compiled from an older source file.

The "file size" attribute is also updated with a new value each time a modification is made. Since most source code modifications cause some change in the file size, the consistency test can detect such modifications by comparing file sizes. Mismatched file sizes indicate that the source file was modified after it was used to compile an object code, or in other words, the object file in question is compiled from an older source file.

The proposed consistency test system checks both last modified date and file size to yield a better accuracy in testing an object file. The size of a source file may not be changed if, for example, the modification is a minor one, and in such a case, the comparison of last modified dates would work well to detect the inconsistency.

Similar to object files, executive files are configured to include a record of last modified date and file size of their original object files, so as to properly determine whether the original version of each object file is consistent with the current version that is saved in the same place.

The present embodiment uses XML in creating an attribute record (last modified date, file size, file location) to be attached to an object or executive file. The use of this platform-independent format enables data exchange between different operating system architectures, including Windows® (a registered trademark of Microsoft Corporation) and Unix® (a registered trademark of The Open Group), as well as ensures data sharing over a wide-area network environment such as the Internet.

The present embodiment also uses the standard URL format when recording file locations as part of an attribute record. While source files, object files, or executive files may be stored in distant computers in a distributed environment, the use of URL format makes it easy to conduct a consistency test of those distributed files by taking advantage of an existing network such as the Internet.

Figure 21:
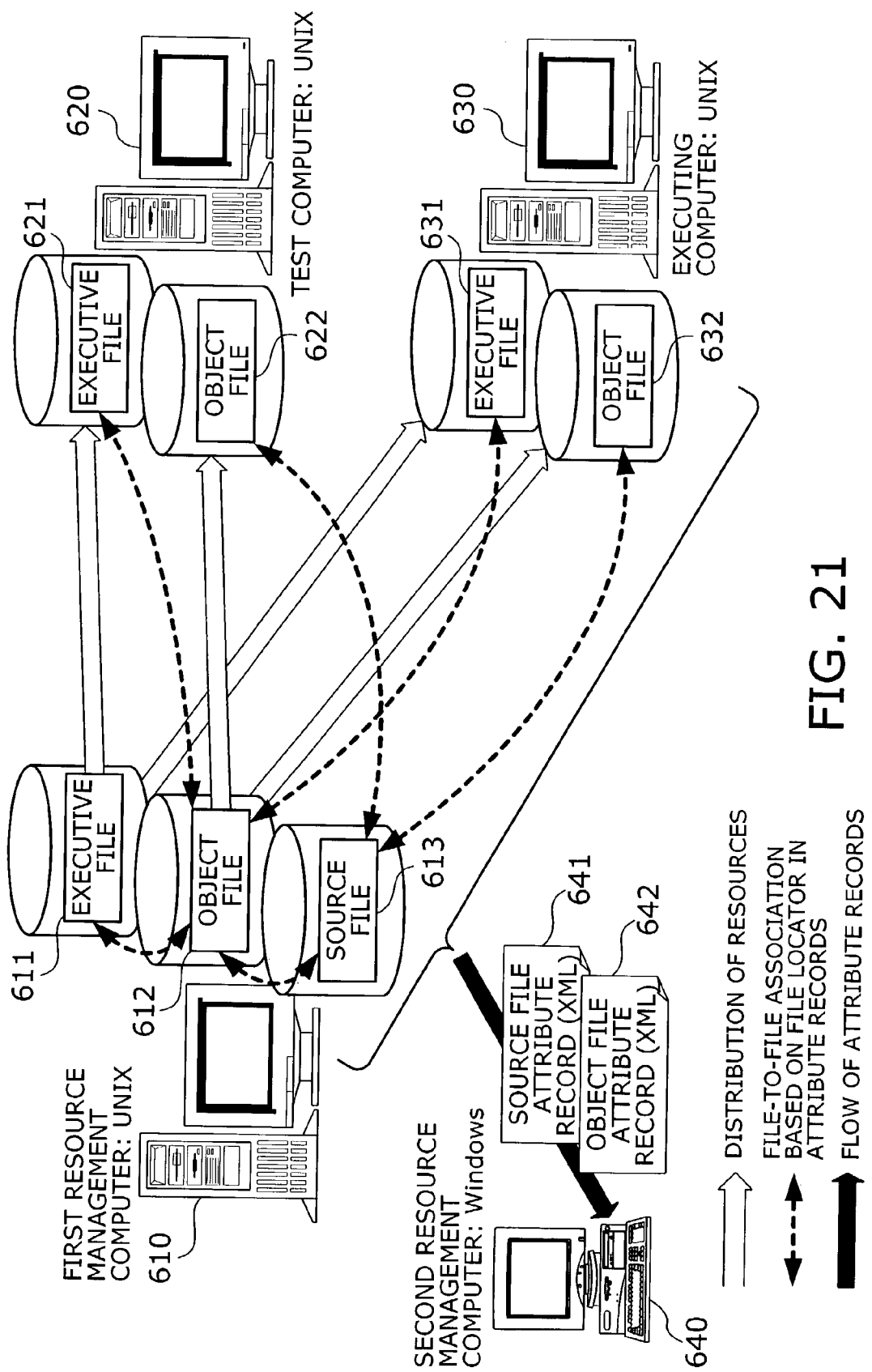
FIG. 21 shows a concept of a library management system in which the present embodiment is embodied.

FIG. 21 shows a concept of a library management system in which the present embodiment is used. This example system of FIG. 21 employs a first resource management computer 610, a test computer 620, an executing computer 630, and a second resource management computer 640. The roles of these four computers are briefly described in the next paragraph.

The first resource management computer 610 controls library resources including an executive file 611, an object file 612, and a source file 613. The test computer 620 is used to test the functions of an executive file 621, object file 622 and other library resources that are originally delivered from the resource management computer 610. The executing computer 630 executes applications including an executive file 631, object file 632 and other library resources that are originally delivered from the resource management computer 610. The second resource management computer 640 does not have any copy of the above files, but manages the library resources from a remote location on the network, making access to a source file attribute record 641 and an object file attribute record 642 stored in the first resource management computer 610. The illustrated system is a heterogeneous computer environment in terms of operating systems. The first resource management computer 610, test computer 620, and executing computer 630 are UNIX®-based computers, while the second resource management computer 640 is a Windows®-based computer.

Suppose that, in the above system, one source file 613 is created on the first resource management computer 610. The resource management computer 610 compiles the source code in this source file 613, thereby creating an object file 612. It further links the object file 612 and other object codes (not shown) into an executive file 611. Those files are registered as part of library resources in the first resource management computer 610.

To test the function of library resources, the first resource management computer 610 delivers the executive file 611 and object file 612 to the test computer 620. The delivered files are stored in the test computer 620's local storage, and their functions are tested by the test computer 620. If they work as expected, the first resource management computer 610 distributes the executive file 611 and object file 612 to the executing computer 630. The delivered files are stored in the executing computer 630's local storage and made available for use.

In the first resource management computer 610, the executive file 611 contains an object file attribute record, and a file locator included therein associates the executive file 611 with its corresponding object file 612. Likewise, the object file 612 contains a source file attribute record, and a file locator included therein associates the object file 612 with its corresponding source file 613.

In the test computer 620, on the other hand, the executive file 621 contains an object file attribute record, and a file locator included therein associates the executive file 621 with the object file 612 stored in the first resource management computer 610. Likewise, the object file 622 contains a source file attribute record, and a file locator included therein associates the object file 622 with the source file 613 stored in the first resource management computer 610.

Also in the executing computer 630, the executive file 631 contains an object file attribute record, and a file locator included therein associates the executive file 631 with the object file 612 stored in the first resource management computer 610. Likewise, the object file 632 contains a source file attribute record, and a file locator included therein associates the object file 632 with the source file 613 stored in the first resource management computer 610.

The file-to-file association described above permits a consistency test among related files to be conducted in several different ways. First, the first resource management computer 610 can check its local library resources using the association between local files. Take its local executive file 621, for example. The first resource management computer 610 extracts an object file attribute record from the executive file 611 of interest and compares that record with current attributes of its associated object file 612. Similarly, it can test its local object file 612 by extracting a source file attribute record from the object file 612 and comparing that record with the current attributes of its associated source file 613.

Second, the test computer 620 can check the consistency between its local library resources with their original counterparts saved in the first resource management computer 610. When testing, for example, an executive file 621, the test computer 620 locates its associated object file 612 by consulting the object file attribute record in the executive file 621 under test, which enables comparison between that attribute record with current attributes of the remote object file 612. Similarly, the test computer 620 can check the consistency of a local object file 622 with its associated source file 613, which is identified with a source file attribute record in the object file 622.

Third, the executing computer 630 can check the consistency between its local library resources with their original counterparts saved in the first resource management computer 610. When testing, for example, an executive file 631, the executing computer 630 locates its associated object file 612 by consulting the object file attribute record in the executive file 631 of interest, which enables comparison between that attribute record with current attributes of the remote object file 612 stored in the resource management computer 610. Similarly, the executing computer 630 can check the consistency of a local object file 632 with its associated source file 613, which is identified with a source file attribute record in the object file 632 of interest.

Fourth, the second resource management computer 640 can conduct a consistency test of remote files, even though its operating system has a different architecture from other computers'. More specifically, the second resource management computer 640 extracts a source file attribute record 641 or object file attribute record 642 from library resources in other computers 610, 620, and 630. Since those attribute records 641 and 642 are written in XML format, the second resource management computer 640 can locate all associated object files and source files, no matter what operating system architecture the remote computers 610, 620, and 630 may use. This feature enables the second resource management computer 640 to test the consistency among files by comparing the source file attribute record 641 or object file attribute record 642 with their corresponding current file attributes.

We have described such a system where object files have a source file attribute record object file, and executive files have an object file attribute record. It is also possible, however, to include both a source file attribute record and an object file attribute record in an executive file. This alternative arrangement enables a computer to directly reach the original source file of a given executive file, without the need for finding an associated object file to consult its source file attribute record.

Referring back to the computer 100 of FIG. 4, recall that the library consistency test unit 150 employs an attribute insertion unit 151, attribute extraction unit 152, and consistency test unit 153. We have assumed in the system of FIG. 21 that every computer is equipped with all those elements. In actual implementations, however, some computers may drop some elements of the library consistency test unit 150. The second resource management computer 640, for example, has to have a consistency test unit 153, but the other elements 151 and 152 are not necessary because it does not store any library resources. Another example is such computers that produce object files and executive files, but do not manage them. Those computers let some other computer take care of the produced library resources, and for this reason, they only need an attribute insertion unit 151. Yet another example is such computers that accommodate library resources, but rely on some remote computer as to their consistency test; those computers have only to have an attribute extraction unit 152.

The above-described processing functions are realized on a computer system with a software program containing instructions for testing consistency of library files. A computer system executes the program to provide the intended functions of the present invention. The program is stored in a computer-readable medium for the purpose of storage and distribution. Suitable computer-readable storage media include magnetic storage media, optical discs, magneto-optical storage media, and solid state memory devices. Magnetic storage media include hard disk drives (HDD), flexible disks (FD), and magnetic tapes. Optical discs include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD family and CD-ROM family, are suitable for the circulation of programs. Network-based distribution of software programs is also possible, in which master program files stored in a server computer are downloaded to user computers via a network.

Each user computer stores necessary program modules in its local storage unit, which have previously been installed from a portable storage media or downloaded from a server computer. The user computer performs intended functions by executing the programs read out of its local storage unit. As an alternative way of program execution, the computer may execute the programs directly from a portable storage medium. Another alternative method is that the user computer dynamically downloads programs from a server computer when they are demanded and executes them upon delivery.

The above discussion is summarized as follows. According to the present invention, a compiled machine code file contains a source file attribute record that includes file location information of its source file and such information that will be updated each time the source file is modified. This source file attribute record enables a computer system to reach the source code afterwards, and it is thus possible to test whether the machine code file is consistent with the latest source file, by comparing current attributes of the source file with the source file attribute record.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of performing a consistency test of a machine code file with respect to an original version and a current version of a source file thereof, the method comprising:
   (a) producing a source file attribute record of a source file when a source code in the source file is compiled into a machine code file, the source file attribute record including file location information indicating where the source file is saved and last modified date information indicating when the source file was last modified;
   (b) appending the source file attribute record to the machine code file as part of the machine code file;
   (c) extracting the source file attribute record out of the machine code file when a consistency test request about the machine code file is received;
   (d) obtaining a last modified date attribute of a current version of the source file that is found in a location indicated by the file location information in the source file attribute record extracted; and (e) comparing the last modified date information in the source file attribute record extracted with the last modified date attribute from said obtaining, thereby determining whether the source file used to compile the machine code file is consistent with the current source file.

2. The method according to claim 1, wherein the source file attribute record includes: information about file size of the source file.

3. The method according to claim 1, wherein the machine code file is an object file that is to be linked with other object files.

4. A method of performing a consistency test of an executive file with respect to an original version and a current version of object files thereof, the method comprising:

(a) producing, for each of object files to be linked into an executive file, an object file attribute record including file location information indicating where said each object file is saved and last modified date information indicating when said each object file was last modified;

(b) appending the produced object file attribute records to the executive file as part of the executive file;

(c) extracting the object file attribute records out of the executive file when a consistency test request about the executive file is received;

(d) obtaining a last modified date attribute of each current object file that is found in a location indicated by the file location information in the corresponding object file attribute record extracted; and (e) comparing the last modified date information in the object file attribute record extracted with the last modified date attribute obtained, thereby determining whether each object file used to produce the executive file is consistent with the current object file.

5. The method according to claim 4, wherein the object file attribute record further includes information about file size of the object file.

6. A computer-readable medium storing a program for performing a consistency test of a machine code file with respect to an original version and a current version of a source file thereof, the program causing a computer system to perform operations comprising:

(a) producing a source file attribute record of a source file when a source code in the source file is compiled into a machine code file, the source file attribute record including file location information indicating where the source file is saved and last modified date information indicating when the source file was last modified;

(b) appending the source file attribute record to the machine code file as part of the machine code file;

(c) extracting the source file attribute record out of the machine code file when a consistency test request about the machine code file is received;

(d) obtaining a last modified date attribute of a current version of the source file that is found in a location indicated by the file location information in the source file attribute record extracted; and (e) comparing the last modified date information in the source file attribute record extracted with the last modified date attribute from said obtaining, thereby determining whether the source file used to compile the machine code file is consistent with the current source file.

7. The computer-readable medium according to claim 1, wherein the source file attribute record further includes information about file size of the source file.

8. The computer-readable medium according to claim 1, wherein the machine code file is an object file that is to be linked with other object files.

9. A computer-readable medium storing a program for performing a consistency test of an executive file with respect to an original version and a current version of object files thereof, the program causing a computer system to perform operations comprising:

(a) producing, for each of object files to be linked into an executive file, an object file attribute record including file location information indicating where said each object file is saved and last modified date information indicating when said each object file was last modified;

(b) appending the produced object file attribute records to the executive file as part of the executive file;

(c) extracting the object file attribute records out of the executive file when a consistency test request about the executive file is received;

(d) obtaining a last modified date attribute of each current object file that is found in a location indicated by the file location information in the corresponding object file attribute record extracted; and (e) comparing the last modified date information in the object file attribute record extracted with the last modified date attribute from said obtaining, thereby determining whether each object file used to produce the executive file is consistent with the current object file.

10. The computer-readable medium according to claim 9, wherein the object file attribute record further includes information about file size of the object file.

11. A system which supports a consistency test of a machine code file with respect to an original version and a current version of a source file thereof, comprising:

one or more processors;

attribute record generation means for producing a source file attribute record of a source file when a source code in the source file is compiled into a machine code file, the source file attribute record including file location information indicating where the source file is saved and last modified date information indicating when the source file was last modified;

attribute record insertion means for appending the source file attribute record to the machine code file as part of the machine code file;

extracting means for extracting the source file attribute record out of the machine code file when a consistency test request about the machine code file is received;

obtaining means for obtaining a last modified date attribute of a current version of the source file that is found in a location indicated by the file location information in the source file attribute record extracted by said extracting means; and comparing means for comparing the last modified date information in the source file attribute record extracted by said extracting means with the last modified date attribute obtained by said obtaining means, thereby determining whether the source file used to compile the machine code file is consistent with the current source file.

* * * * *